US012682249B1

(12) United States Patent
Collado Umana

(10) Patent No.: US 12,682,249 B1
(45) Date of Patent: Jul. 14, 2026

(54) AGENTIC-BASED APPROACH FOR REDUCING FALSE POSITIVES IN MACHINE LEARNING MODEL OUTPUT CLASSIFICATIONS

(71) Applicant: HiddenLayer, Inc., Austin, TX (US)

(72) Inventor: Julian Collado Umana, Irvine, CA (US)

(73) Assignee: HiddenLayer, Inc., Austin, TX (US)

( * ) Notice: Subject to any disclaimer, the term of this patent is extended or adjusted under 35 U.S.C. 154(b) by 0 days.

(21) Appl. No.: 19/459,984

(22) Filed: Jan. 26, 2026

(51) Int. Cl.
*G06N 3/094* (2023.01)
*G06N 3/04* (2023.01)

(52) U.S. Cl.
CPC .............. *G06N 3/094* (2023.01); *G06N 3/04* (2013.01)

(58) Field of Classification Search
None
See application file for complete search history.

(56) References Cited

U.S. PATENT DOCUMENTS

| | | | |
|---|---|---|---|
| 7,673,147 | B2 | 3/2010 | Moghe et al. |
| 10,089,482 | B2 | 10/2018 | Skipper et al. |
| 10,397,255 | B1 | 8/2019 | Bhalotra et al. |
| 10,721,247 | B2 | 7/2020 | Komashinskiy et al. |
| 10,902,111 | B2 | 1/2021 | Stolfo et al. |
| 11,288,369 | B1 | 3/2022 | Grzonkowski et al. |
| 11,475,375 | B1 | 10/2022 | Al-Khayet et al. |
| 11,520,829 | B2 | 12/2022 | Rosenthal et al. |

| | | | |
|---|---|---|---|
| 11,526,601 | B2 | 12/2022 | Rouhani et al. |
| 11,551,137 | B1 | 1/2023 | Echauz et al. |
| 11,601,444 | B1 * | 3/2023 | Vashisht ............... G06F 40/205 |
| 11,665,201 | B2 | 5/2023 | Kinder et al. |
| 11,936,686 | B2 | 3/2024 | Freire et al. |
| 11,971,914 | B1 | 4/2024 | Watson et al. |
| 11,983,271 | B2 | 5/2024 | dos Santos Silva et al. |
| 11,991,199 | B2 | 5/2024 | Achleitner et al. |

(Continued)

OTHER PUBLICATIONS

"Safety is Not Only About Refusal: Reasoning-Enhanced Fine-tuning for Interpretable LLM Safety", Zhang et al.*

(Continued)

*Primary Examiner* — Haimei Jiang
(74) *Attorney, Agent, or Firm* — Jones Day

(57) ABSTRACT

Techniques are provided for adjudicating suspected-malicious samples using in-context gating and an appeals stage to reduce false positives. A first-stage classifier generates a benign-or-malicious verdict. When malicious is indicated, a context-gating model determines whether the sample is in-context for a target application domain. If out-of-context, the initial verdict is finalized. If in-context, contextual information is assembled by retrieving and condensing items from a knowledge base via similarity search. The sample and the contextual information are then supplied to an appeals model, distinct from the first-stage classifier and the context-gating model, which issues a context-sensitive verdict. The appeals verdict is emitted as the final decision. This architecture separates fast screening from domain-aware reasoning, enabling dynamic incorporation of deployment-specific knowledge without retraining the first-stage classifier, improving accuracy, and providing a principled fallback when the sample is out-of-scope for the application domain.

30 Claims, 21 Drawing Sheets

(56) References Cited

U.S. PATENT DOCUMENTS

| | | | |
|---|---|---|---|
| 11,997,059 B1 | 5/2024 | Su et al. | |
| 12,026,255 B1 | 7/2024 | Burns et al. | |
| 12,034,751 B2 | 7/2024 | Borges | |
| 12,174,954 B1 | 12/2024 | Yeung et al. | |
| 12,254,120 B2 | 3/2025 | Beveridge et al. | |
| 12,314,380 B2 | 5/2025 | Burns et al. | |
| 12,475,705 B2 | 11/2025 | Das et al. | |
| 12,500,909 B1* | 12/2025 | Westenberger | H04L 63/1416 |
| 2008/0086775 A1 | 4/2008 | Repasi et al. | |
| 2008/0244690 A1 | 10/2008 | Kulkarni et al. | |
| 2015/0264058 A1 | 9/2015 | Locasto et al. | |
| 2017/0185675 A1 | 6/2017 | Arngren | |
| 2019/0268245 A1 | 8/2019 | Roth et al. | |
| 2020/0074336 A1 | 3/2020 | Saxe et al. | |
| 2020/0320438 A1* | 10/2020 | Lin | G06N 5/01 |
| 2020/0351307 A1 | 11/2020 | Vidas et al. | |
| 2020/0394466 A1 | 12/2020 | Jia et al. | |
| 2021/0157912 A1 | 5/2021 | Sai et al. | |
| 2021/0203674 A1 | 7/2021 | Azaria et al. | |
| 2021/0224425 A1 | 7/2021 | Nasr-Azadani et al. | |
| 2021/0279336 A1 | 9/2021 | Cmielowski et al. | |
| 2021/0319093 A1 | 10/2021 | Molloy et al. | |
| 2021/0385232 A1* | 12/2021 | Kutt | G06N 3/09 |
| 2022/0038474 A1 | 2/2022 | Nag | |
| 2022/0043910 A1 | 2/2022 | Chistyakov et al. | |
| 2022/0046057 A1* | 2/2022 | Kutt | G06N 3/0985 |
| 2022/0174089 A1 | 6/2022 | Piegert et al. | |
| 2022/0385675 A1 | 12/2022 | Tora et al. | |
| 2023/0004654 A1 | 1/2023 | Jurzak et al. | |
| 2023/0148116 A1 | 5/2023 | Stokes et al. | |
| 2023/0222363 A1 | 7/2023 | Bernat et al. | |
| 2023/0325678 A1 | 10/2023 | Fradkin et al. | |
| 2024/0022600 A1 | 1/2024 | Zhang et al. | |
| 2024/0031387 A1 | 1/2024 | Reynolds et al. | |
| 2024/0039934 A1 | 2/2024 | Zoldi et al. | |
| 2024/0054233 A1 | 2/2024 | Ohayon et al. | |
| 2024/0111868 A1 | 4/2024 | Da Silva et al. | |
| 2025/0307418 A1 | 10/2025 | Spencer et al. | |
| 2025/0307419 A1 | 10/2025 | Belgi et al. | |
| 2025/0307462 A1 | 10/2025 | Bhonsle et al. | |
| 2025/0322244 A1 | 10/2025 | Mysore et al. | |
| 2025/0335573 A1 | 10/2025 | Kale et al. | |
| 2025/0336204 A1 | 10/2025 | Park et al. | |
| 2025/0337775 A1 | 10/2025 | Kawasaki et al. | |
| 2025/0363200 A1 | 11/2025 | Reagan et al. | |
| 2025/0373627 A1 | 12/2025 | Hu et al. | |
| 2025/0384400 A1 | 12/2025 | Chakravarthula et al. | |
| 2025/0390603 A1 | 12/2025 | Kamyshenko et al. | |
| 2026/0010562 A1 | 1/2026 | Peterson | |
| 2026/0017386 A1 | 1/2026 | Ohayon et al. | |
| 2026/0030247 A1* | 1/2026 | Zhang | G06F 16/24564 |
| 2026/0058995 A1 | 2/2026 | Purathepparambil et al. | |
| 2026/0067314 A1 | 3/2026 | Reddy et al. | |
| 2026/0087387 A1 | 3/2026 | Williamson | |
| 2026/0087406 A1 | 3/2026 | Ghosh et al. | |

OTHER PUBLICATIONS

"Adversarially Robust and Interpretable Magecart Malware Detection", Pereira et al, 2025.*

"A Multi-Agent System for Cybersecurity Threat Detection and Correlation Using Large Language Models", Hmimou et al, 2025.*

Enhancing Contextual Understanding in Large Language Models through Contrastive Decoding, Zhao et al, Jun. 2024.*

"Contextualized Evaluations: Judging language model responses to underspecified queries", Malaviya et al, Jul. 22, 2025.*

* cited by examiner

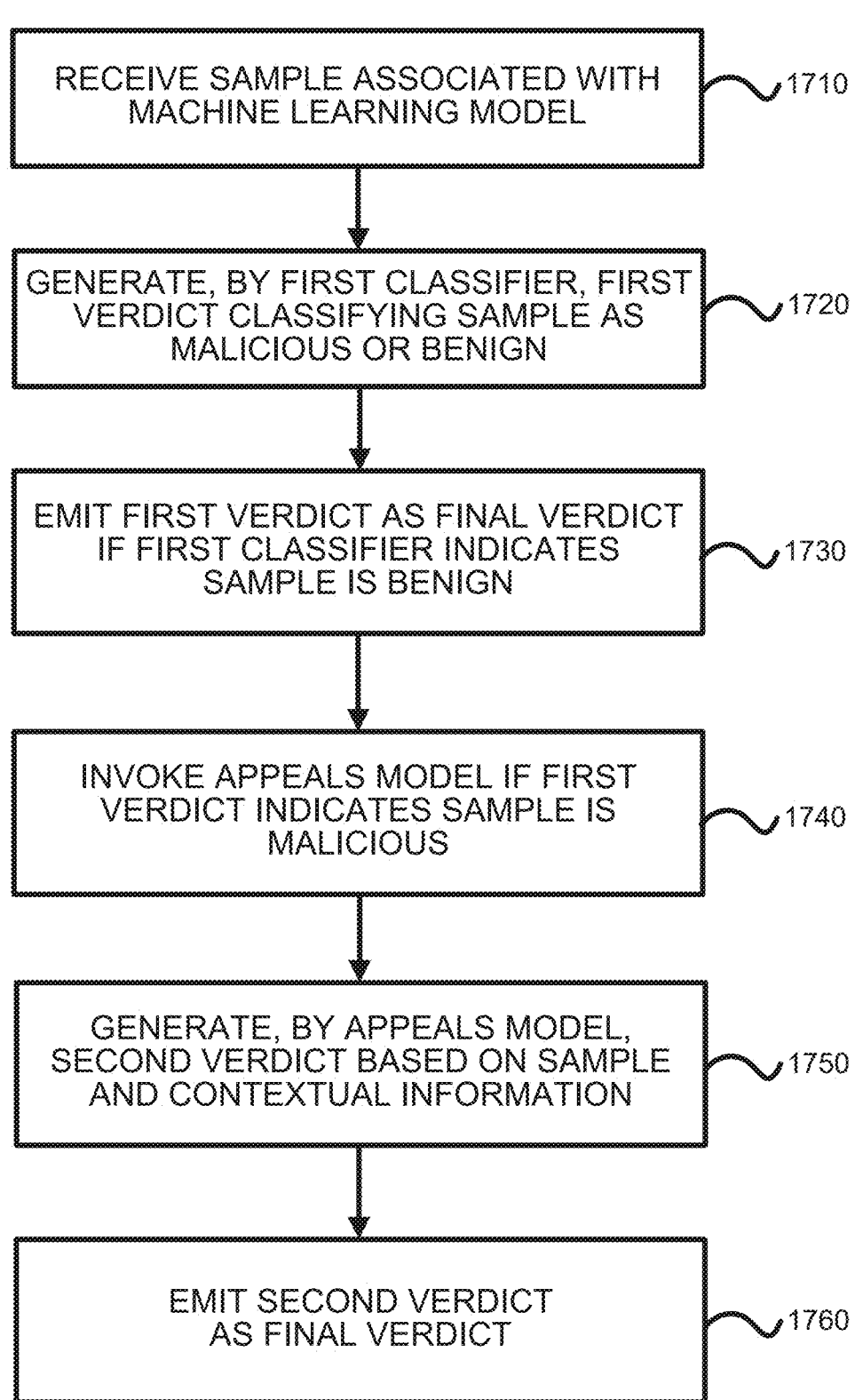

RECEIVE SAMPLE ASSOCIATED WITH MACHINE LEARNING MODEL ⟩ 1710

GENERATE, BY FIRST CLASSIFIER, FIRST VERDICT CLASSIFYING SAMPLE AS MALICIOUS OR BENIGN ⟩ 1720

EMIT FIRST VERDICT AS FINAL VERDICT IF FIRST CLASSIFIER INDICATES SAMPLE IS BENIGN ⟩ 1730

INVOKE APPEALS MODEL IF FIRST VERDICT INDICATES SAMPLE IS MALICIOUS ⟩ 1740

GENERATE, BY APPEALS MODEL, SECOND VERDICT BASED ON SAMPLE AND CONTEXTUAL INFORMATION ⟩ 1750

EMIT SECOND VERDICT AS FINAL VERDICT ⟩ 1760

FIG. 17

AGENTIC-BASED APPROACH FOR REDUCING FALSE POSITIVES IN MACHINE LEARNING MODEL OUTPUT CLASSIFICATIONS

TECHNICAL FIELD

The subject matter described herein relates to agentic-based techniques for reducing the number of false positive classifications of a machine learning models.

BACKGROUND

Systems that detect harmful or unwanted content-such as undesired behavior in a machine learning model- or any similarly imbalanced classification task must be highly sensitive to false positives, since most samples are benign. Yet some signals that are typically malicious can be benign in specific contexts. For example, asking how to "destroy a building" is generally harmful, but harmless in a video game context. A system optimized for broad malicious-behavior detection will often flag such cases as malicious, because it lacks the specialized context that justifies the exception.

SUMMARY

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 17 is a process flow diagram illustrating a first technique for false positives in machine learning model output classifications.

Like reference symbols in the various drawings indicate like elements.

DETAILED DESCRIPTION

The subject matter concerns systems and methods for detecting and mitigating adversarial activity targeting machine learning model architectures (MLAs), including architectures that aggregate multiple uni- or multimodal models. Detected attacks trigger remediation to prevent unsafe, privacy-violating, or policy-noncompliant behavior. While described with "machine learning models," the techniques apply broadly to artificial intelligence systems, including large language models (LLMs), vision-language models (VLMs), speech models, and tool-augmented agents.

Figure 1:
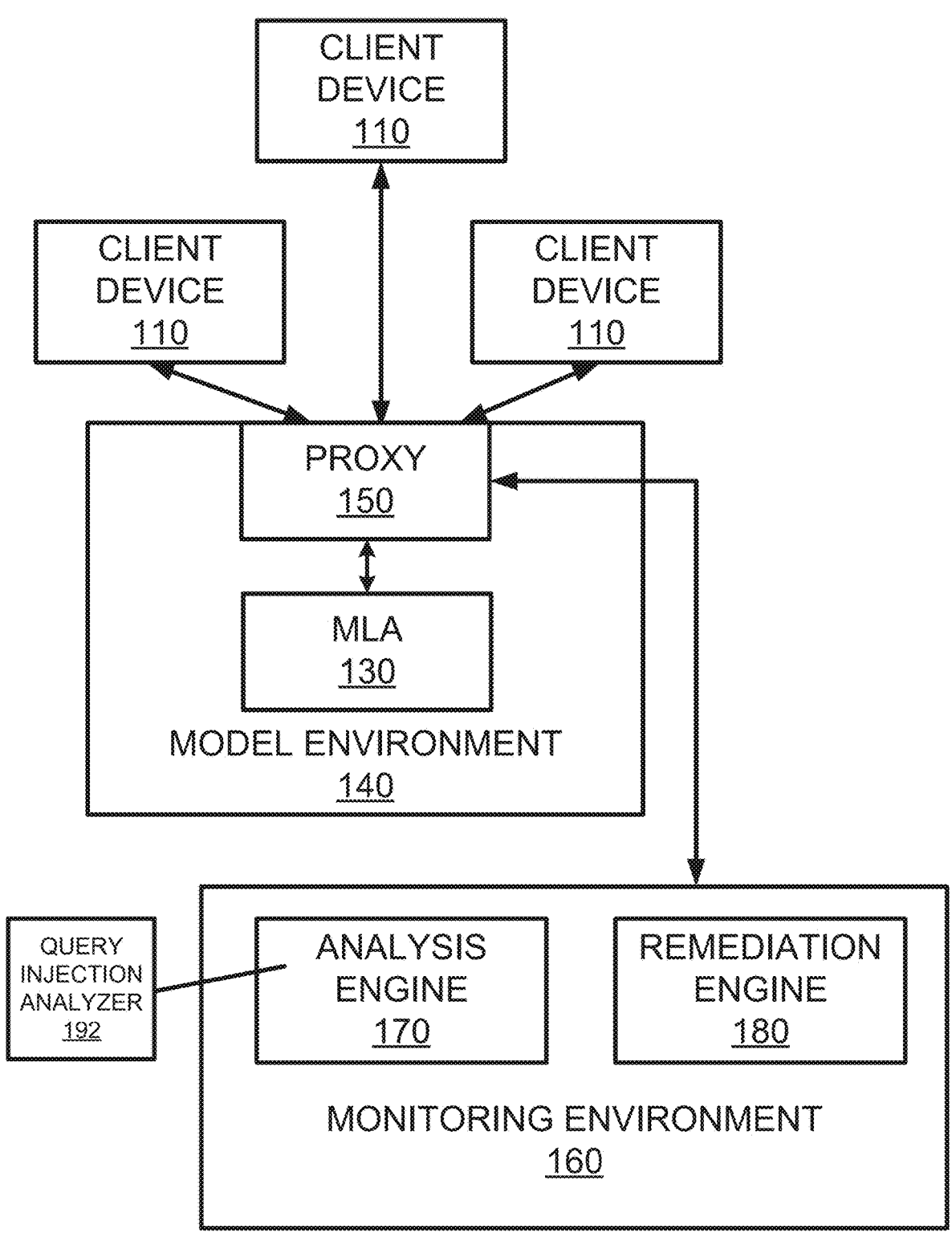
FIG. 1 is a system diagram illustrating a security platform for machine learning model architectures having a monitoring environment including an analysis engine and remediation engine.

FIG. 1 depicts a system in which client devices 110 (e.g., endpoints, application servers, batch jobs) access an MLA 130 hosted in a model environment 140 via one or more networks. Queries can include prompts (alphanumeric strings), structured inputs (JSON), and multimodal payloads (text, audio, images, video, and files). The model environment 140 comprises scalable compute and storage (e.g., GPU/TPU clusters, vector stores, feature caches) to run the MLA 130 and serve responses. The MLA 130 can be a native multimodal foundation model or an ensemble with modality-specific models (e.g., text LLM+image encoder/decoder+automatic speech recognition (ASR)/text-to-speech (TTS). A proxy 150 intermediates traffic to analyze, intercept, and optionally transform inputs and outputs. The proxy supports synchronous and asynchronous decision paths, enforces latency budgets, and exposes policy-driven actions.

The proxy 150 communicates with a monitoring environment 160 that hosts an analysis engine 170. The analysis engine executes threat detection pipelines and models to protect MLA 130. A query injection analyzer 192 performs multimodal characterization, including the following. For text, it can use token- and span-level classifiers for jailbreak and prompt-injection patterns, assess semantic similarity to known attack clusters, disentangle instruction-following versus tool-use intent, perform dependency parsing and control-code detection, and apply out-of-distribution (OOD) and intent-shift scoring via embedding encoders. For images and video, it can perform Contrastive Language-Image Pretraining (CLIP)/A Large-scale ImaGe and Noisy-text embedding (ALIGN) consistency checks, detect adversarial patches and perturbations, identify steganography and hidden-text or OCR overlays, run safety and nudity classifiers, extract QR/barcode and watermarked content, and detect temporal inconsistency and splicing. For audio, it can use ASR plus phonetic adversarial cue detection, filter inaudible or ultrasonic commands, verify speakers and detect spoofing, and identify emotion or prosody anomalies. For files, it can perform MIME and magic-byte validation, extract macros or scripts, analyze Portable Document Format (PDF) structure and hidden-layer text, and detect model-specific payload signatures such as jailbreak payloads embedded in Exchangeable Image File Format (EXIF) or Extensible Metadata Platform (XMP) metadata. For cross-modal content, it can compute alignment scores between modalities, detect instruction-channel leakage such as image-embedded instructions directing text behavior, and flag retrieval or tool-use anomalies when cross-modal content induces out-of-scope actions.

The proxy 150 can relay full queries or derived artifacts (excerpts, embeddings, hashes, features, provenance metadata) to the monitoring environment 160 prior to MLA ingestion. Feature extraction can include per-modality embeddings, spectral or gradient-based signals (where available), perplexity and entropy measures, structured entity spans (PII, secrets, regulated data), tool invocation intents, and session context deltas.

The analysis engine 170 evaluates relayed data to assess maliciousness using an ensemble of detectors: supervised classifiers, anomaly detection, Bayesian calibrators for confidence, rule/pattern engines, and graph-based correlation across sessions/users/IPs. Decisions produce a risk score, attack taxonomy (e.g., jailbreak, data exfiltration, prompt injection, tool abuse, cross-modal coercion, policy violation), and recommended actions. A remediation engine 180 (local or external) can enforce outcomes via the proxy 150. It can block queries by rejecting them prior to MLA execution. It can transform queries by redacting PII or secrets, stripping adversarial substrings, sanitizing HTML or Markdown, downscaling or blurring images, removing audio ultrasonic bands, transcoding files, or using OCR to rewrite and remove hidden overlays. It can constrain queries by switching to a safer model or decoding policy, such as constrained decoding, lower temperature, disabling tool-use, or applying retrieval allowlists. It can also disable write-capable tools, enforce tool argument schemas, or restrict system prompts. Additionally, it can gate queries by requiring user verification, rate-limiting, or escalating for human review. Modified queries, once sanitized, can proceed to MLA 130, with outputs optionally re-evaluated by analysis engine 170 before delivery.

The proxy 150 can also relay MLA outputs or output features (such as extracted entities, policy spans, tool call traces, images or audio generated, or differences from prior turns) to the monitoring environment 160 before returning them to clients. Output analysis can detect leakage, unsafe content, model inversion indicators, and hallucinated tool results, either standalone or combined with input context. Remediation can block or transform outputs, for example by redacting, summarizing, or substituting safe references, or trigger containment actions such as disabling session tools or revoking credentials injected via tools.

Figure 2:
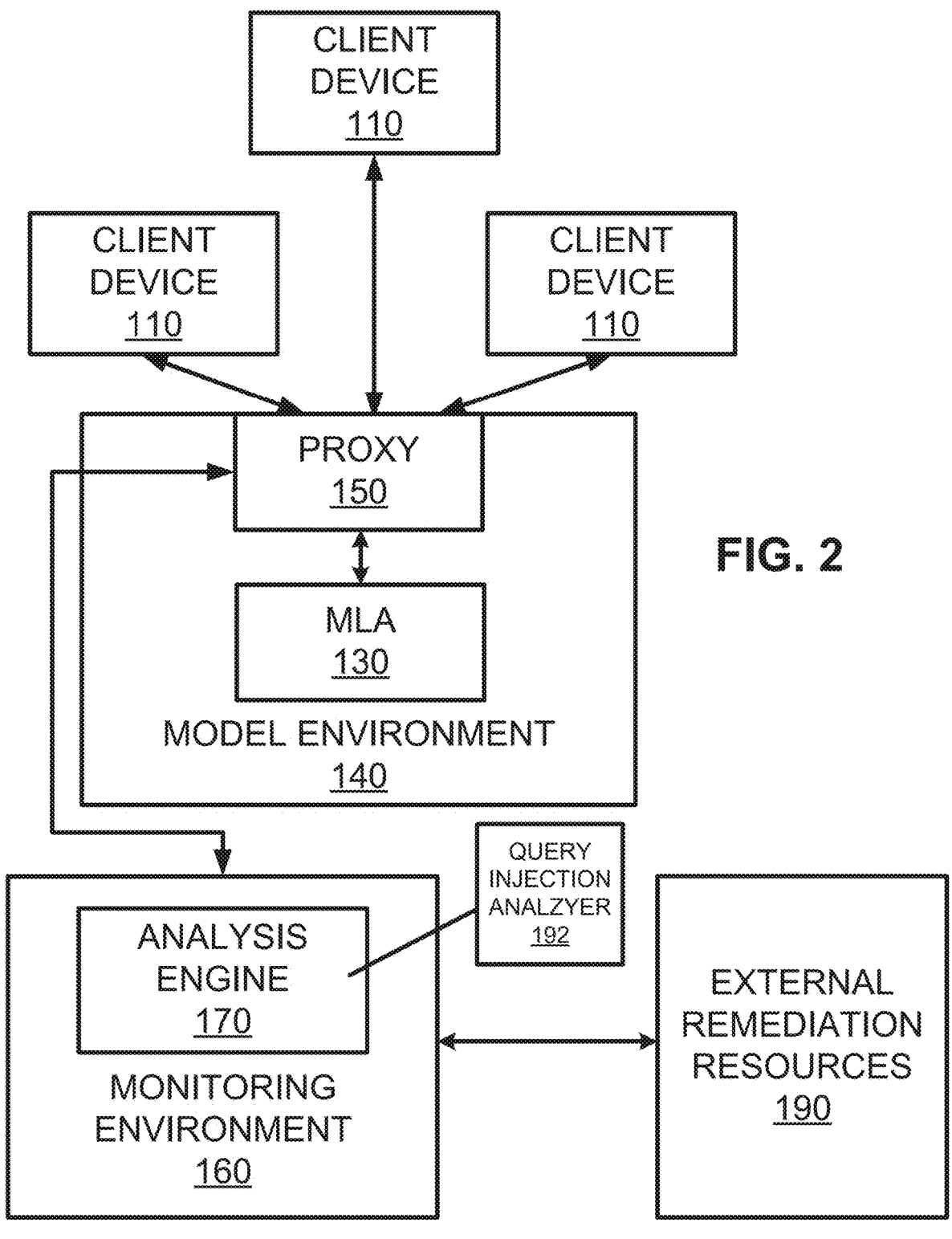
FIG. 2 is a system diagram illustrating a security platform for machine learning model architectures having a monitoring environment including an analysis engine which interfaces with external remediation resources.

FIG. 2 illustrates a configuration where the monitoring environment 160 includes analysis engine 170 and integrates with external remediation resources 190 rather than hosting remediation engine 180. External remediation resources can include network and identity controls such as web application firewall (WAF) rules, IP or user blocklists, device posture checks, and Mutual Transport Layer Security (mTLS) enforcement. They can also include platform actions like circuit breakers, canary disablement, rollback, and feature flags. Data-plane controls can involve data loss prevention (DLP) quarantine, storage revocation, and retrieval index masking. Incident response can include session kill, key rotation, and audit or event routing to Security Information and Event Management (SIEM) or Security Orchestration, Automation, and Response (SOAR) systems.

Figure 3:
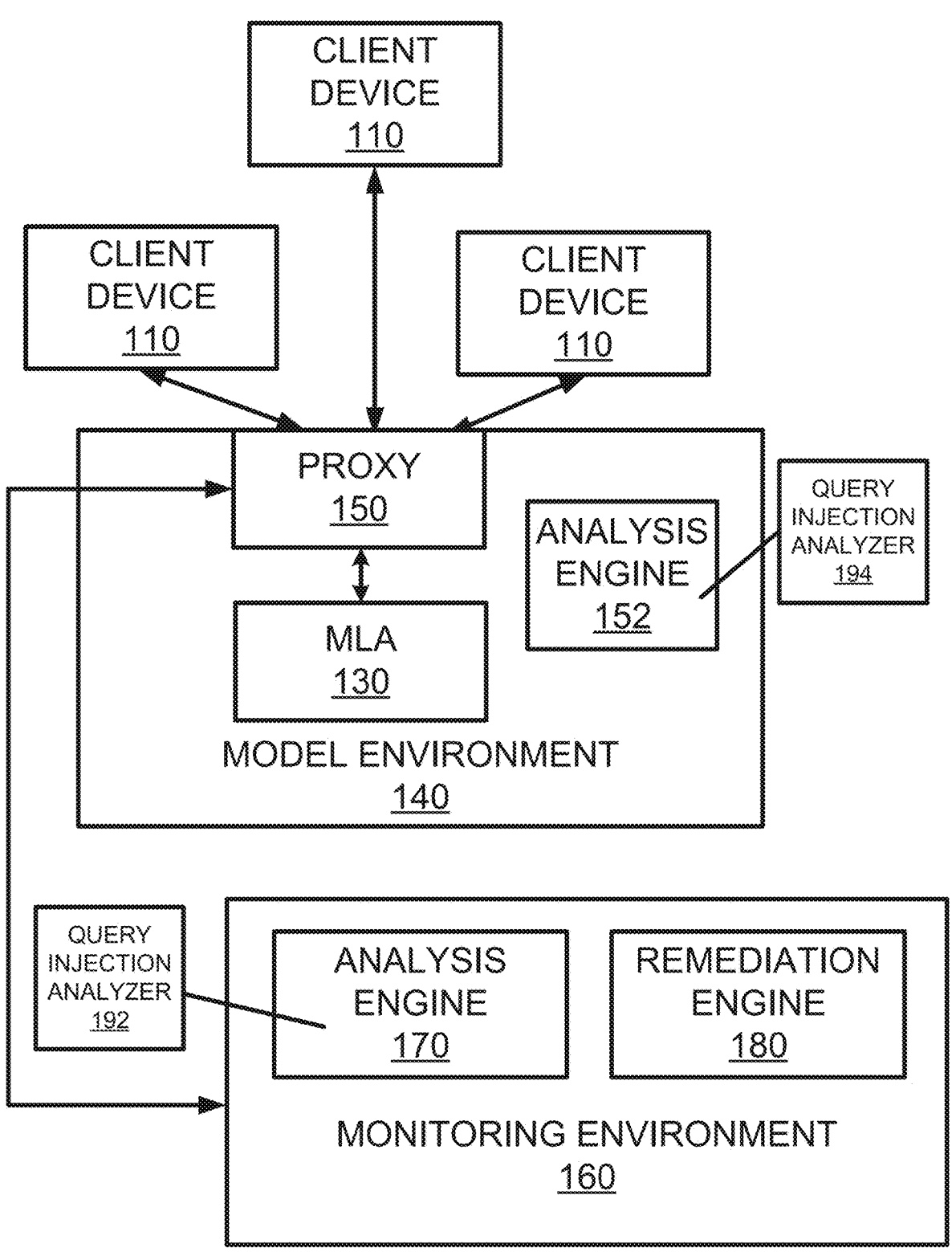
FIG. 3 is a system diagram illustrating a security platform for machine learning model architectures having a model environment having a local analysis engine and a monitoring environment including an analysis engine and a remediation engine.

FIG. 3 shows an architecture with a local analysis engine 152 in the model environment 140, plus analysis engine 170 and remediation engine 180 in monitoring environment 160. The local analysis engine 152 can perform fast-path screening with lightweight models and heuristics, such as token regex filters, compact classifiers, and image patch detectors, to decide whether to pass through, locally remediate, or escalate to monitoring for deeper analysis, such as using larger ensembles or cross-session correlation. A local query injection analyzer 194 can mirror or complement analyzer 192 with modality- and cost-optimized detectors. Escalation can include transmitting full payloads or compact feature bundles under privacy policies.

Figure 4:
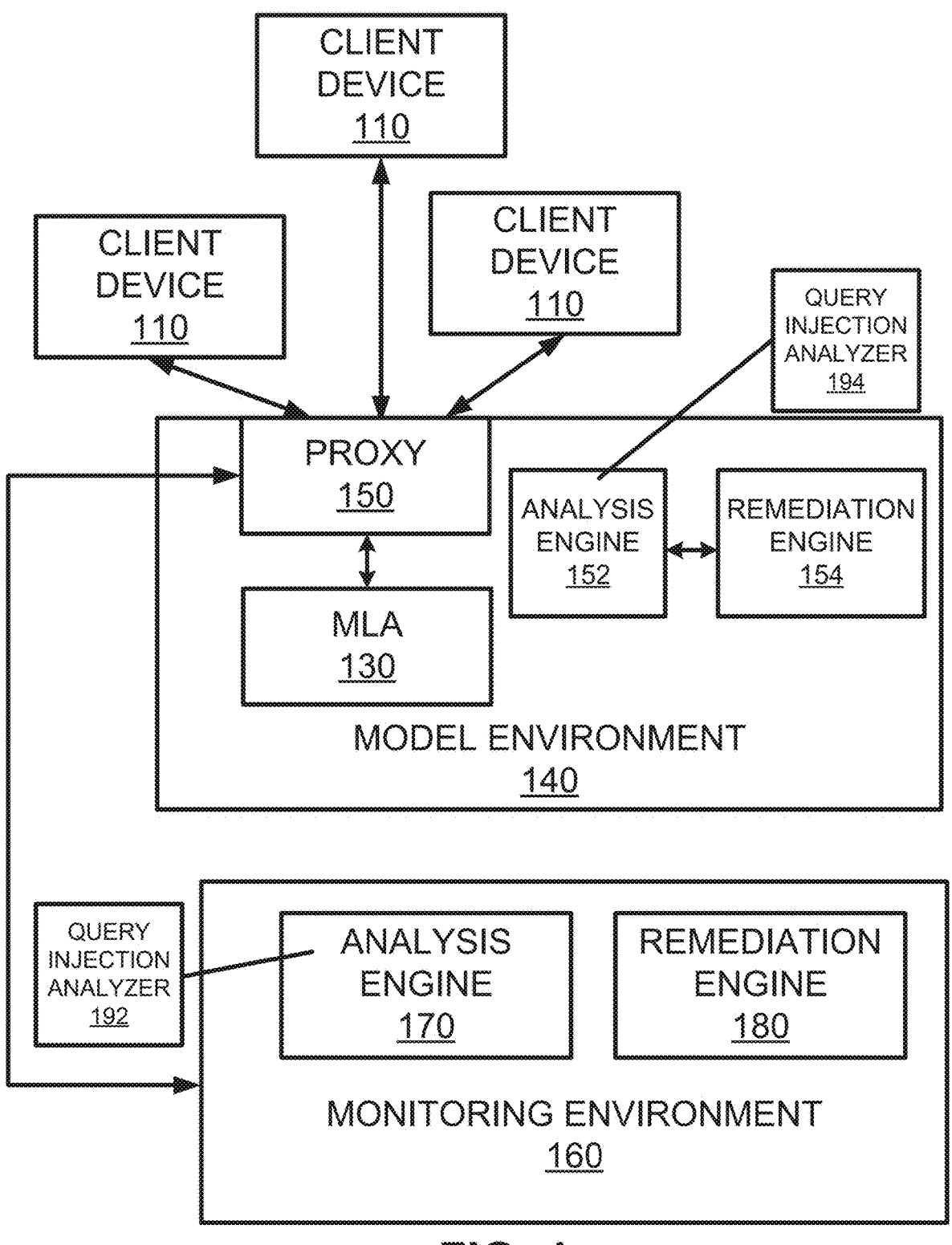
FIG. 4 is a system diagram illustrating a security platform for machine learning model architectures having a model environment having a local analysis engine and a local remediation engine and a monitoring environment including an analysis engine and a remediation engine.

FIG. 4 extends the architecture of FIG. 3 by adding a local remediation engine 154 alongside local analysis engine 152. The local remediation engine can execute low-latency actions such as blocking, redacting, constraining decoding, or tool gating, while more complex or high-confidence-required actions are coordinated by remediation engine 180 in the monitoring environment 160. Policy routing can determine when to remediate locally versus escalate, considering confidence, severity, and SLA or latency budgets.

Figure 5:
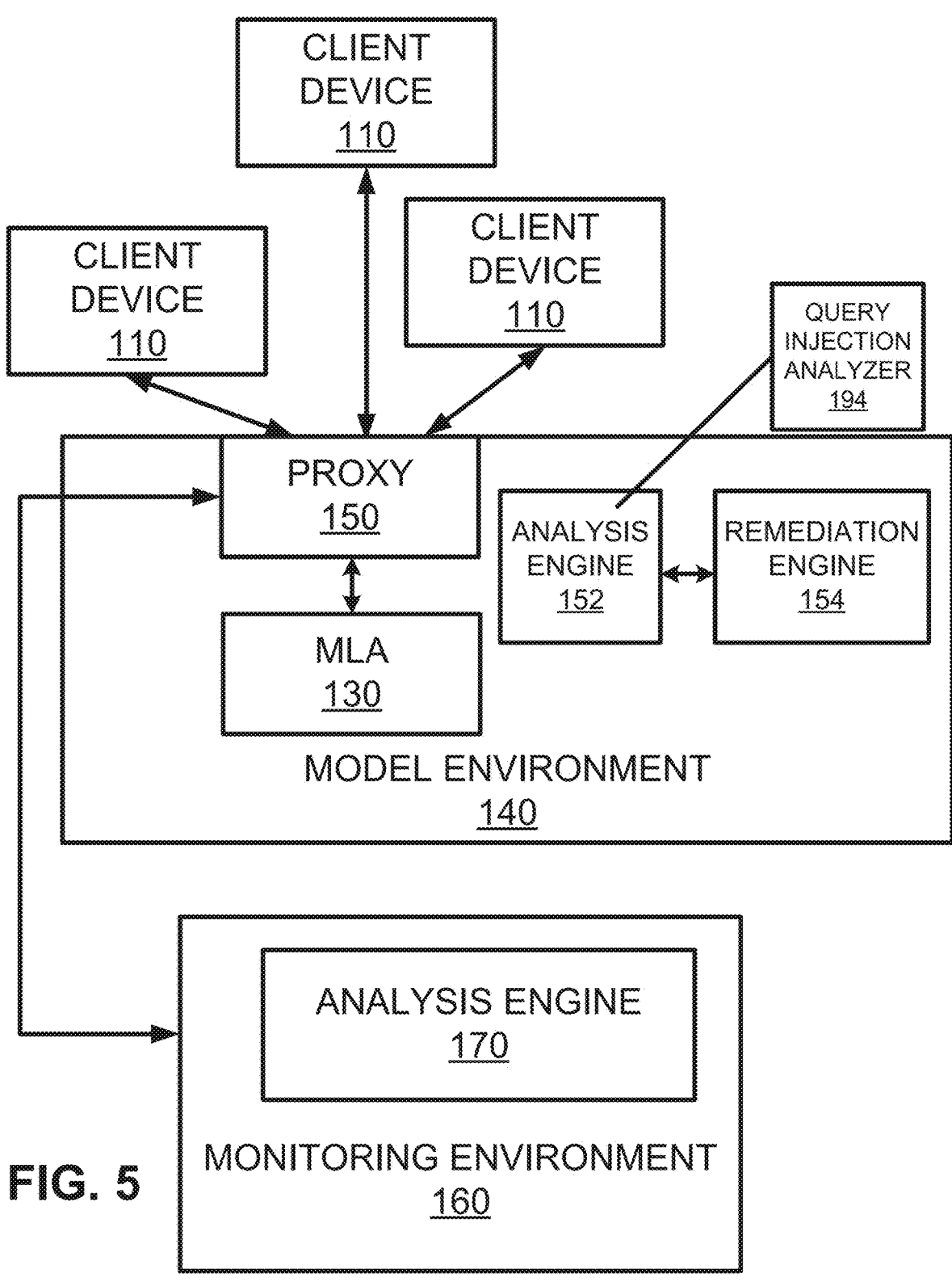
FIG. 5 is a system diagram illustrating a security platform for machine learning model architectures having a model environment having a local analysis engine and a local remediation engine and a monitoring environment including an analysis engine.

FIG. 5 illustrates a configuration with local analysis engine 152 and local remediation engine 154 in the model environment 140, and analysis engine 170 in the monitoring environment 160 without a remediation engine. In this design, the monitoring analysis issues decisions or scores that the local remediation engine 154 enforces, enabling on-prem or air-gapped remediation while still leveraging centralized detection intelligence.

Implementation details applicable across configurations are as follows. On the data plane, proxy 150 can support REST or gRPC streaming, backpressure, and sideband telemetry. It can enforce schema validation and content-type whitelists, and can support content provenance such as C2PA, watermark verification, and cryptographic signatures.

For security, the system can use mTLS, JSON web token (JWT) or OpenID Connect (OIDC) authentication, attribute-based access control, per-tenant isolation, differential privacy and redaction for telemetry, and secure enclaves for secret scanning. Detection pipelines can be retrainable via human-in-the-loop feedback, can support continuous learning from labeled incidents, can allow shadow evaluation of new detectors, and can monitor for drift and out-of-distribution (OOD) events. The policy engine can use declarative policies mapping model, modality, user, and risk to actions, can be versioned with audit trails, and can support canary and staged rollout. Tool and retrieval-augmented generation (RAG) hardening can include allowlists and denylists, argument validators, bounded function execution, retrieval index filters, content safety checks on retrieved documents, and canary tokens to detect exfiltration attempts. Observability can be achieved through structured logs, metrics such as true positive and false positive rates and latency, traces across proxy, analysis, and model components, SIEM or SOAR integration, and incident timelines and session graphs. For performance, the system can use tiered analysis (fast-path versus deep analysis), approximate nearest neighbor search for attack similarity, caching of feature hashes, and GPU batching for heavy detectors.

These mechanisms collectively provide layered defense for multimodal MLAs, detecting and mitigating adversarial inputs and unsafe outputs with minimal latency impact while preserving model utility and compliance.

Figure 6:
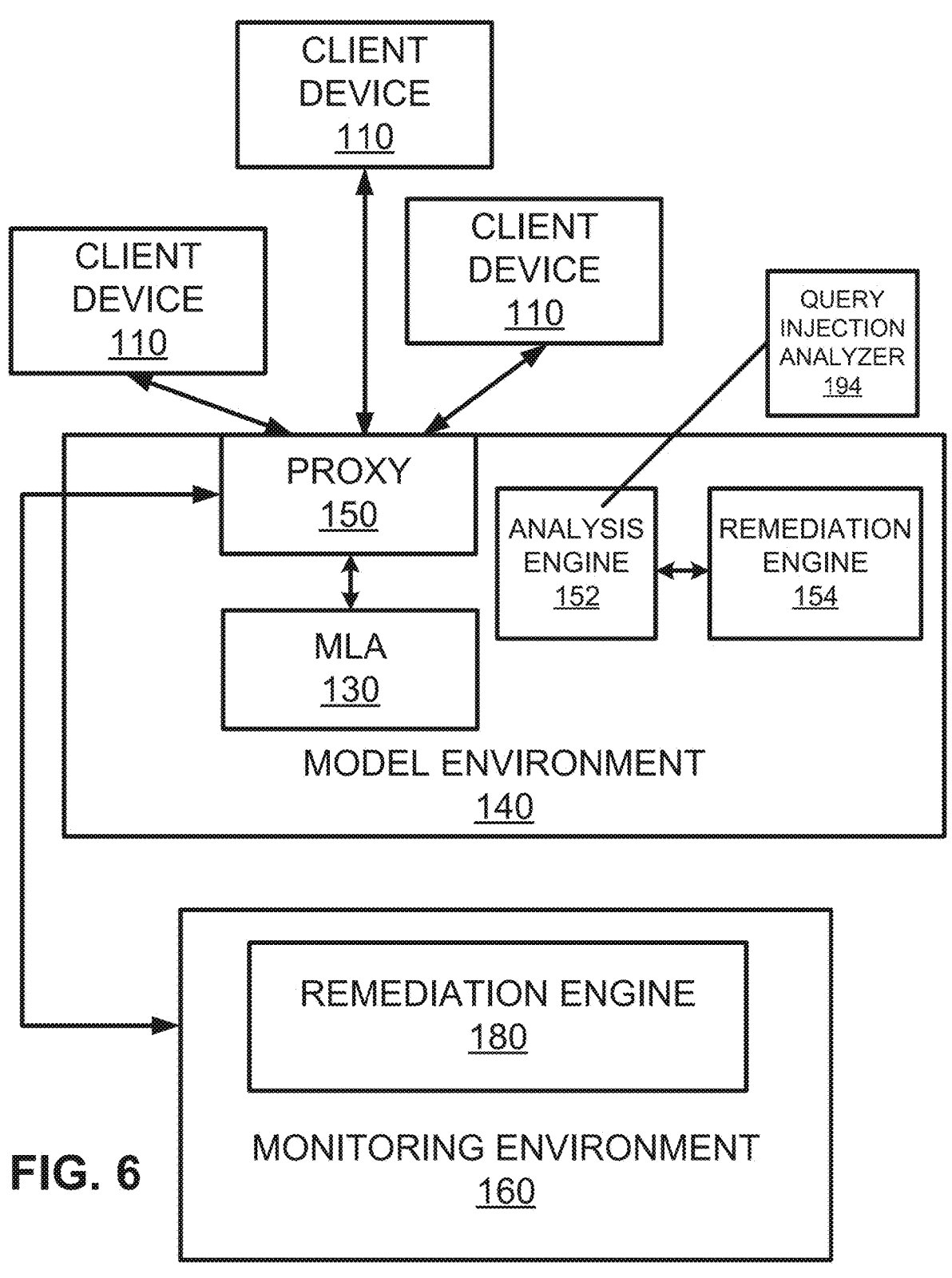
FIG. 6 is a system diagram illustrating a security platform for machine learning model architectures having a model environment having a local analysis engine and a local remediation engine and a monitoring environment including a remediation engine.

FIG. 6 is a system diagram illustrating a security platform for ML model architectures in which the model environment 140 includes a local analysis engine 152 and a local remediation engine 154, and the monitoring environment 160 includes a remediation engine 180 (without an analysis engine). In this arrangement, the local analysis engine 152 performs inline analysis of inputs and/or outputs proximal to the MLA 130, enabling low-latency gating. The local remediation engine 154 can trigger immediate actions (e.g., response redaction, query throttling, session termination). Alternatively, the model environment 140 can transmit structured telemetry (e.g., instruction vectors, risk scores, features, and audit metadata) over a secure channel (e.g., mTLS) to the monitoring environment 160, where the remediation engine 180 can orchestrate one or more remedial actions via policy engines or SOAR playbooks.

Figure 7:
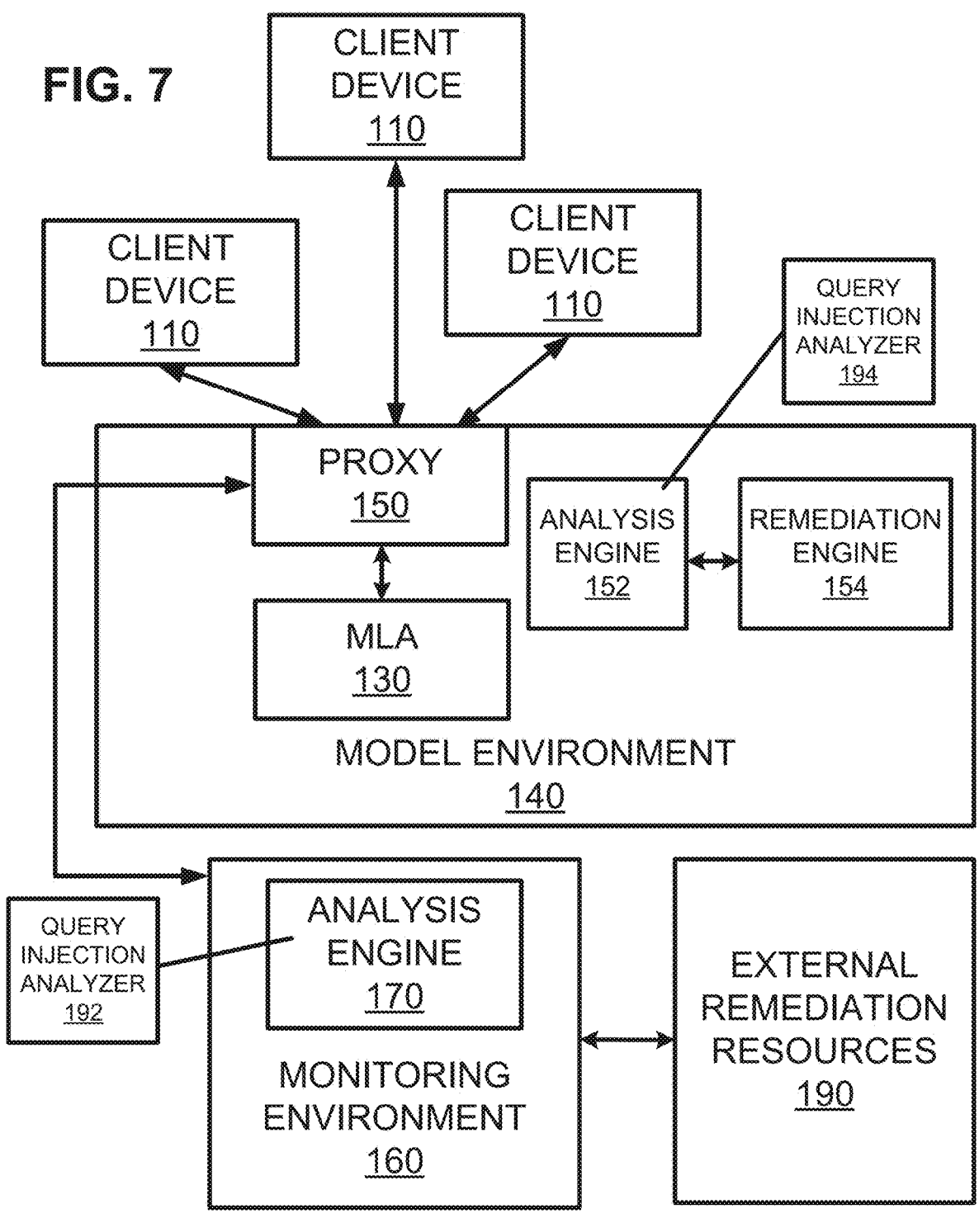
FIG. 7 is a system diagram illustrating a security platform for machine learning model architectures having a model environment having a local analysis engine and a local remediation engine and a monitoring environment including an analysis engine which interfaces with external remediation resources.

FIG. 7 is a system diagram illustrating a security platform in which the model environment 140 includes a local analysis engine 152 and a local remediation engine 154, while the monitoring environment 160 includes an analysis engine 170 that interfaces with external remediation resources 190. In this arrangement, the local remediation engine 154 can execute hard real-time mitigations, and the analysis engine 170 can perform deeper, higher-latency analysis (e.g., batch or streaming via a message bus) to drive actions by external remediation resources 190. The monitoring environment 160 can send normalized artifacts (e.g., tokenized text, sentence embeddings, classifier scores, provenance tags) to the external remediation resources 190, which can initiate enforcement (e.g., WAF rules, IDS/IPS updates, identity provider step-up authentication, SIEM correlation, SOAR workflows).

Figure 8:
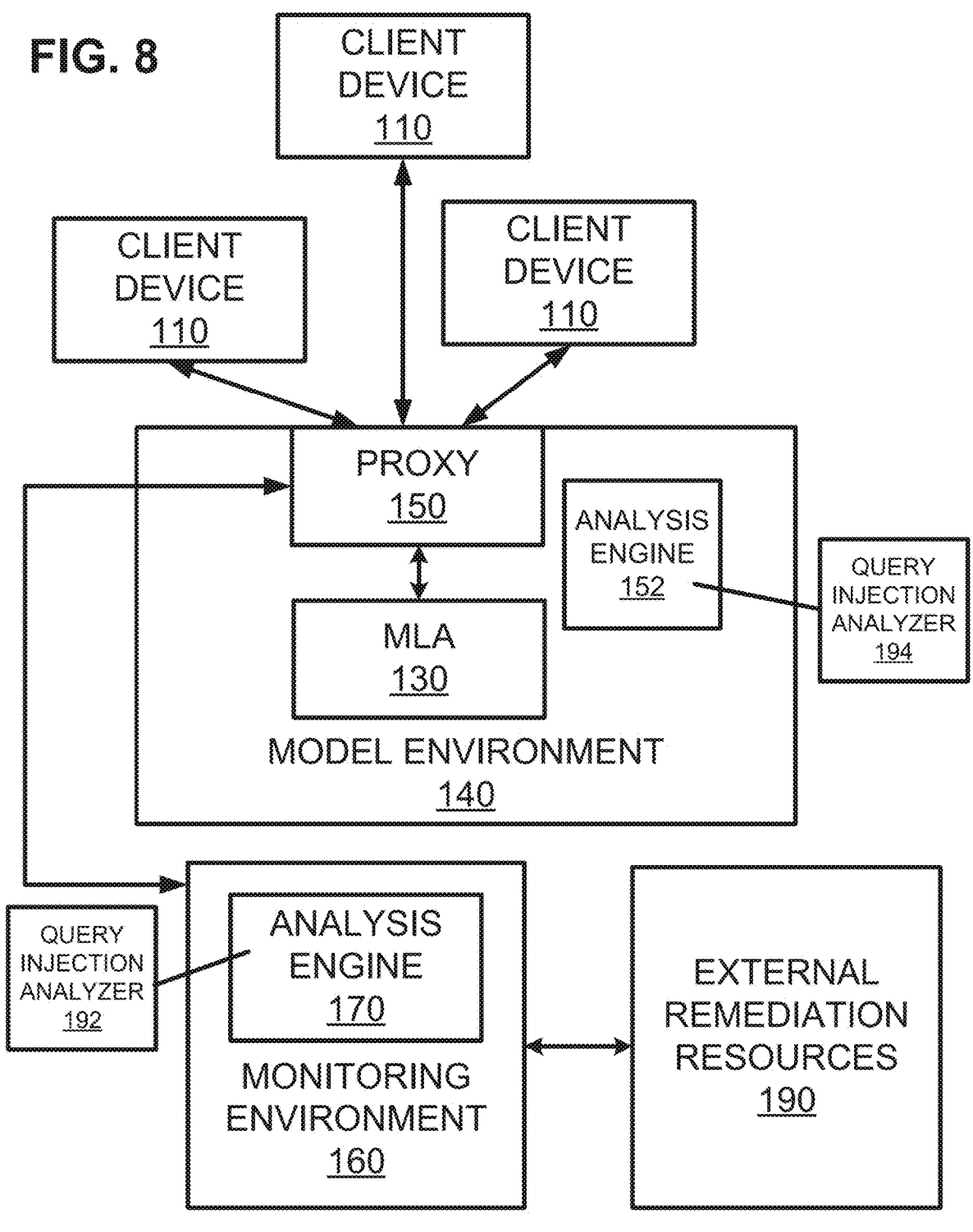
FIG. 8 is a system diagram illustrating a security platform for machine learning model architectures having a model environment having a local analysis engine and a monitoring environment including an analysis engine which interfaces with external remediation resources.

FIG. 8 is a system diagram illustrating a security platform in which the model environment 140 includes a local analysis engine 152 and the monitoring environment 160 includes an analysis engine 170 (without a remediation engine). Analysis can be executed cooperatively across both engines 152, 170, enabling hybrid inference (e.g., lightweight heuristics locally, heavyweight models remotely), while remediation actions are initiated by external remediation resources 190 (e.g., ticketing, firewall policy updates, API gateway blocks, data loss prevention rules).

Figure 9:
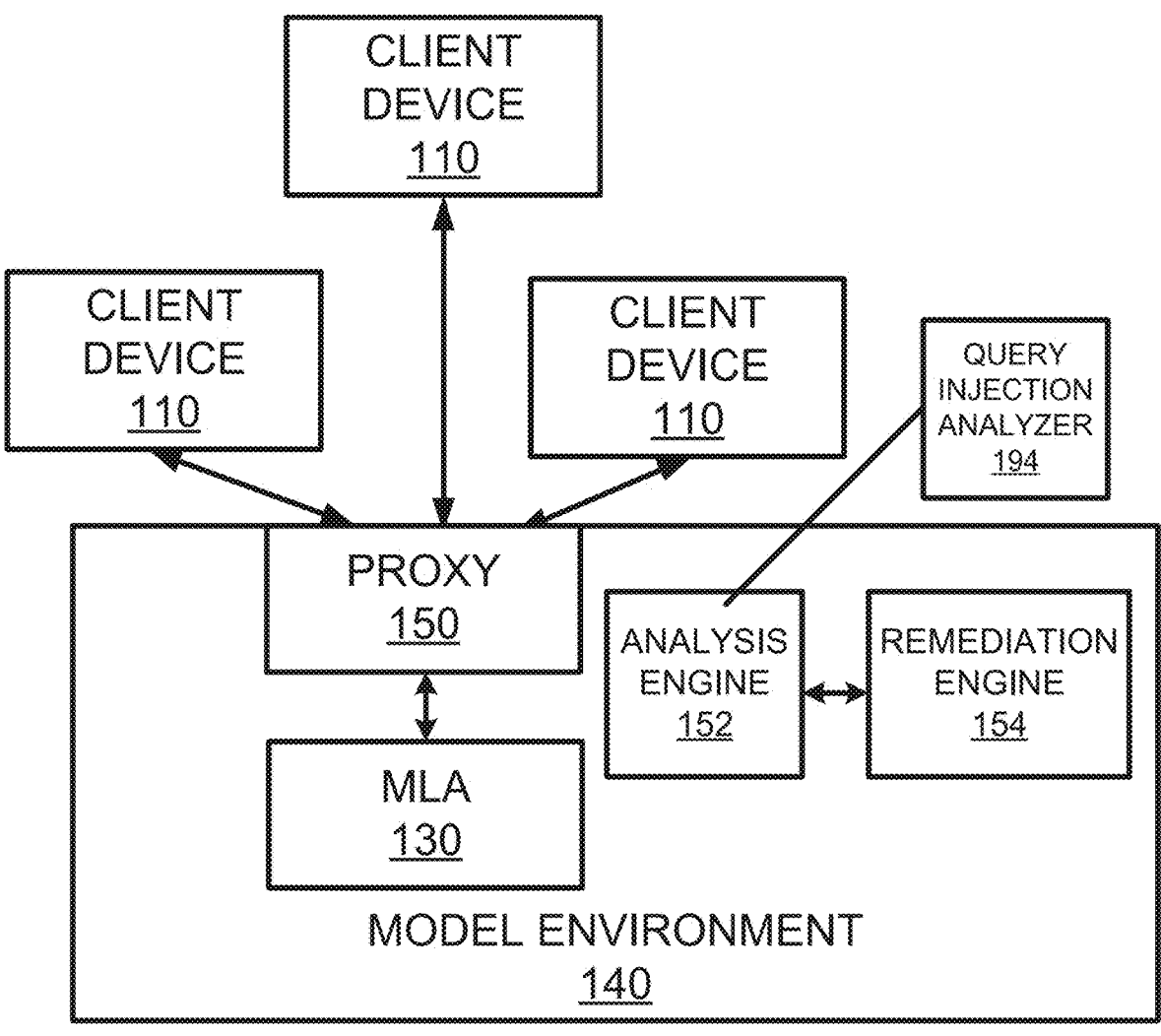
FIG. 9 is a system diagram illustrating a security platform for machine learning model architectures having a model environment having a local analysis engine and remediation engine.

FIG. 9 is a system diagram illustrating a security platform in which the model environment 140 includes a local analysis engine 152 and a local remediation engine 154. Analysis and remediation are executed entirely within the model environment 140, enabling air-gapped or on-premises deployments, reduced egress of sensitive data, and deterministic latency budgets suitable for inline request gating and response shaping, without reliance on the monitoring environment 160.

Figure 10:
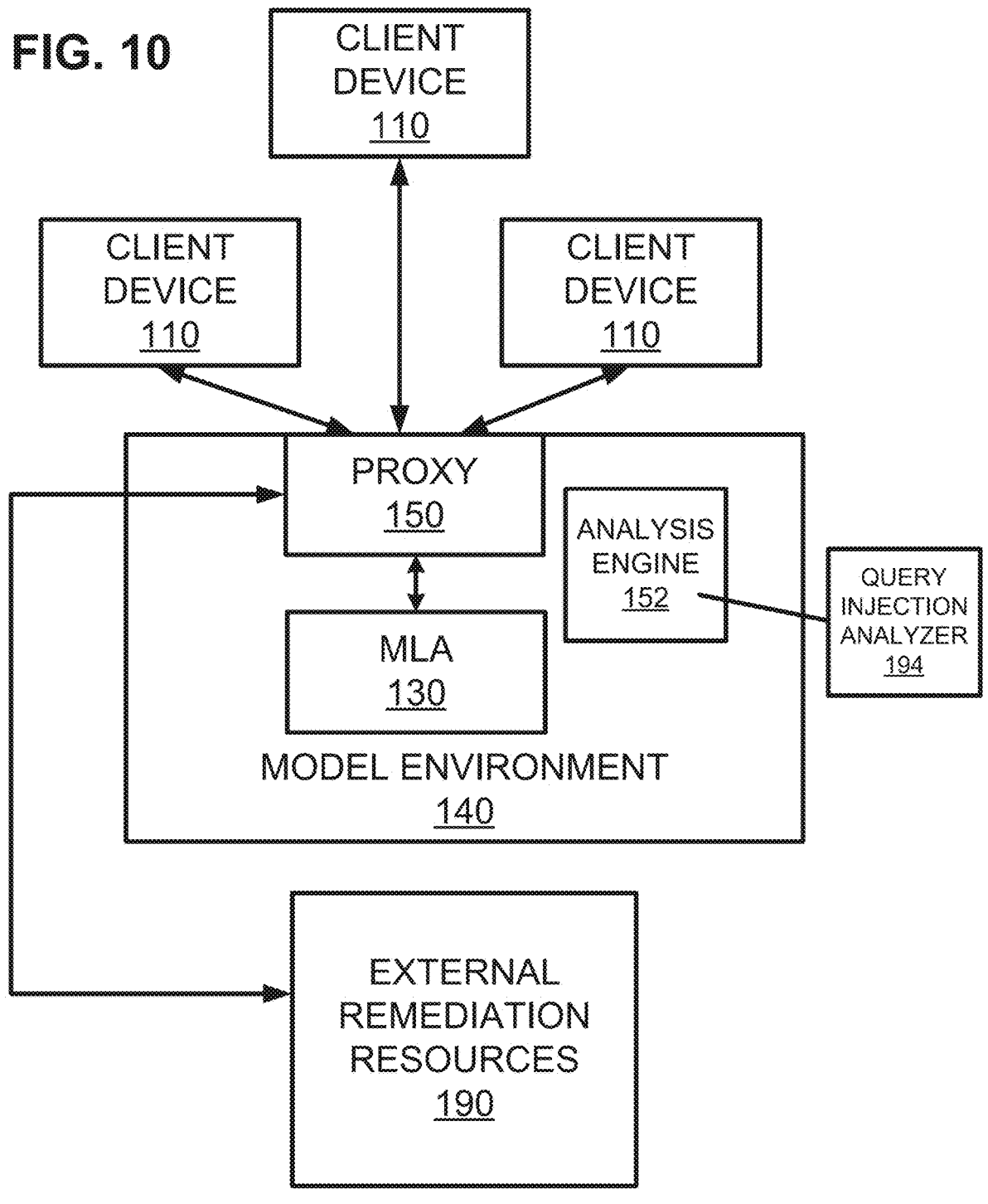
FIG. 10 is a system diagram illustrating a security platform for machine learning model architectures having a model environment having a local analysis engine which interfaces with external remediation resources.

FIG. 10 is a system diagram illustrating a security platform in which the model environment 140 includes a local analysis engine 152 that interfaces with external remediation resources 190. Queries (including prompts and tool inputs) are analyzed locally to generate decisions and risk telemetry. Remediation actions are initiated by external remediation resources 190 (which can be outside the monitoring environment 160), such as SOAR platforms, case management systems, identity providers, or network controls, using signed webhooks or message queues with replay protection.

Figure 11:
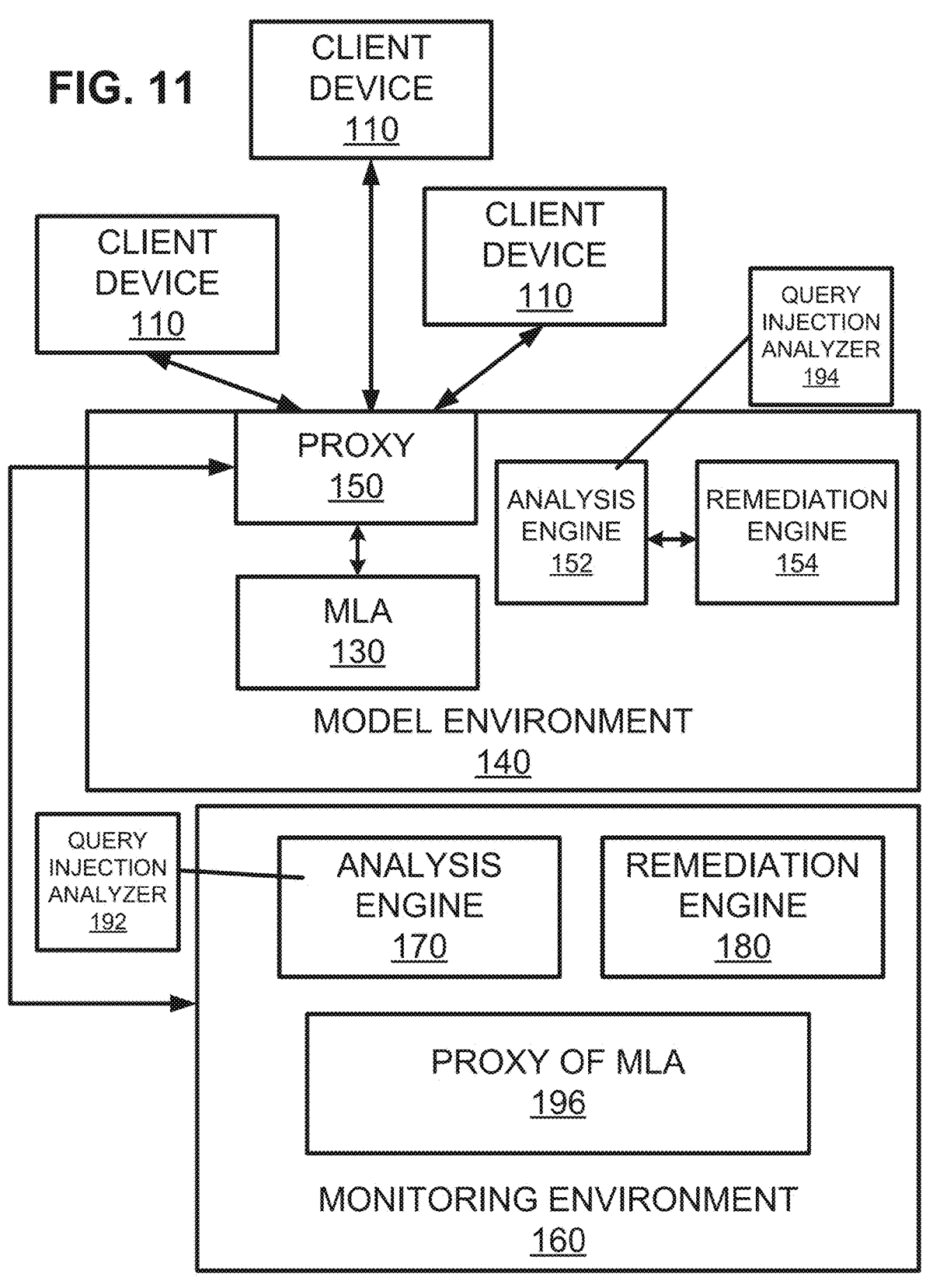
FIG. 11 is a system diagram illustrating a security platform for machine learning model architectures having a model environment which has a proxy of the machine learning architecture.

FIG. 11 is a system diagram illustrating a configuration in which the model environment includes both a local analysis engine 152 and a local remediation engine 154, and the monitoring environment 160 includes an analysis engine 170, a remediation engine 180, and an MLA proxy 196 for some or all of the MLA 130. The MLA proxy 196 is a surrogate model or cascade of models that emulate MLA 130 behavior for pre-ingestion screening. The MLA proxy 196 can ingest a query; its output and/or intermediate representations (e.g., hidden states, attention maps, layer-wise activations prior to the output layer) can be supplied to a query injection analyzer 192. The analysis engine 170 can decide whether to allow the MLA 130 to ingest the query based on proxy outputs or intermediate features, enabling speculative execution and early rejection without touching the primary MLA 130.

One or more analysis engines 152, 170 can instantiate a query injection analyzer 192, 194. The analyzer can be: (i) a binary classifier that labels a query as malicious or benign; (ii) a multi-class classifier that assigns trust levels (e.g., malicious, suspicious, benign); and/or (iii) a multi-class classifier that identifies one or more attack types. Multiple analyzers 192, 194 can form an ensemble (i.e., multiple ML models) arranged in parallel (score fusion via majority vote, weighted averaging, or stacking) or in sequence (e.g., a fast binary gate followed by a specialized multi-class model for malicious cases). A lightweight model can execute in the analysis engine 152 to meet strict latency budgets, while a more computationally expensive model runs in the analysis engine 170 for higher fidelity. This design can reduce false positives and compute cost.

The query injection analyzer 192, 194 can be implemented using ML models such as XGBoost, logistic regression, XLNet, transformer encoders, or OOD detectors (e.g., energy-based, Mahalanobis distance, or deep ensemble uncertainty). For binary classifiers, training data can include labeled benign queries and labeled malicious queries containing adversarial character sequences (e.g., mixed alphanumerics, non-printable characters, control tokens, Unicode homoglyphs). "Malicious" refers to inputs that cause the MLA 130 to exhibit undesired behavior (e.g., goal hijacking, data exfiltration), and "benign" refers to inputs that do not. Training can use sentence embeddings (e.g., SBERT, CLS token from transformers), character-level features, and structural features (e.g., prompt delimiter patterns).

The query injection analyzer 192, 194 can also use a rules engine and heuristic methods (e.g., regex signatures, control-token frequency thresholds, Unicode normalization checks, context-window manipulation patterns). Hybrid pipelines can combine ML-based and non-ML-based techniques in parallel and fuse their outputs with calibrated scoring (e.g., Platt scaling, temperature scaling).

For multi-class classification, the training corpus can include labeled examples per category (e.g., severity levels and attack types). Input transformation can include tokenization, normalization (e.g., NFC), sentence embeddings, n-gram features, and positional encodings. Class imbalance can be mitigated via focal loss, class weighting, or data augmentation (e.g., character perturbations, paraphrasing).

The query injection analyzer 192, 194 can be periodically retrained to reflect emerging attack techniques and new remediation capabilities. Continuous learning can be supported via scheduled batch retraining, active learning from analyst feedback, adversarial training, and drift detection on feature distributions and performance KPIs (e.g., precision, recall, AUROC).

After training, the analysis engines 152, 170 can preprocess incoming queries (e.g., sanitize inputs, normalize Unicode, tokenize, generate sentence embeddings) and feed them to the query injection analyzer 192, 194 for inference. Binary classifier outputs can be calibrated confidence scores in [0,1], where scores near 1 indicate malicious and near 0 indicate benign. Multi-class outputs can include class labels and per-class probabilities, plus uncertainty metrics (e.g., entropy). Decisions can be logged with request IDs, timestamps, and feature hashes for auditability.

The multi-class variant of the query injection analyzer 192, 194 can drive attack-specific remediation tailored to the identified type (e.g., attempts to extract sensitive information or manipulate MLA 130 outputs). Example attack types include: Direct task deflection: assign a new persona or objectives to divert MLA 130 from its intended task. Special case injection: obfuscate malicious intent using special characters, homoglyphs, or control tokens. Context continuation: interleave benign and malicious turns to exploit conversational memory. Context termination: force template or blank-filling behavior to elicit restricted outputs. Syntactic transformation: restructure prompts to bypass pattern-based guards. Encryption/encoding: embed payloads using specified ciphers or encodings and ask for decoding. Text redirection: coerce tool-use or chain-of-thought redirection to external sources or tools. Remediation can be executed by the model environment remediation engine 154, the monitoring environment remediation engine 180, and/or external remediation resources 190. Actions can include: IP blocking or rate limiting; query filtering/redaction (e.g., personally identifiable information (PII) removal, policy-based rewriting); response suppression or safe completion; session quarantine; SIEM alerting; SOAR ticketing and automated playbooks; dynamic WAF/IDS rule updates; capture of system/process telemetry for forensic analytics; and RBAC-based user challenges. Policies can adapt based on severity (e.g., malicious, highly suspicious, unknown) and can be A/B tested to balance security and user experience.

Figure 12:
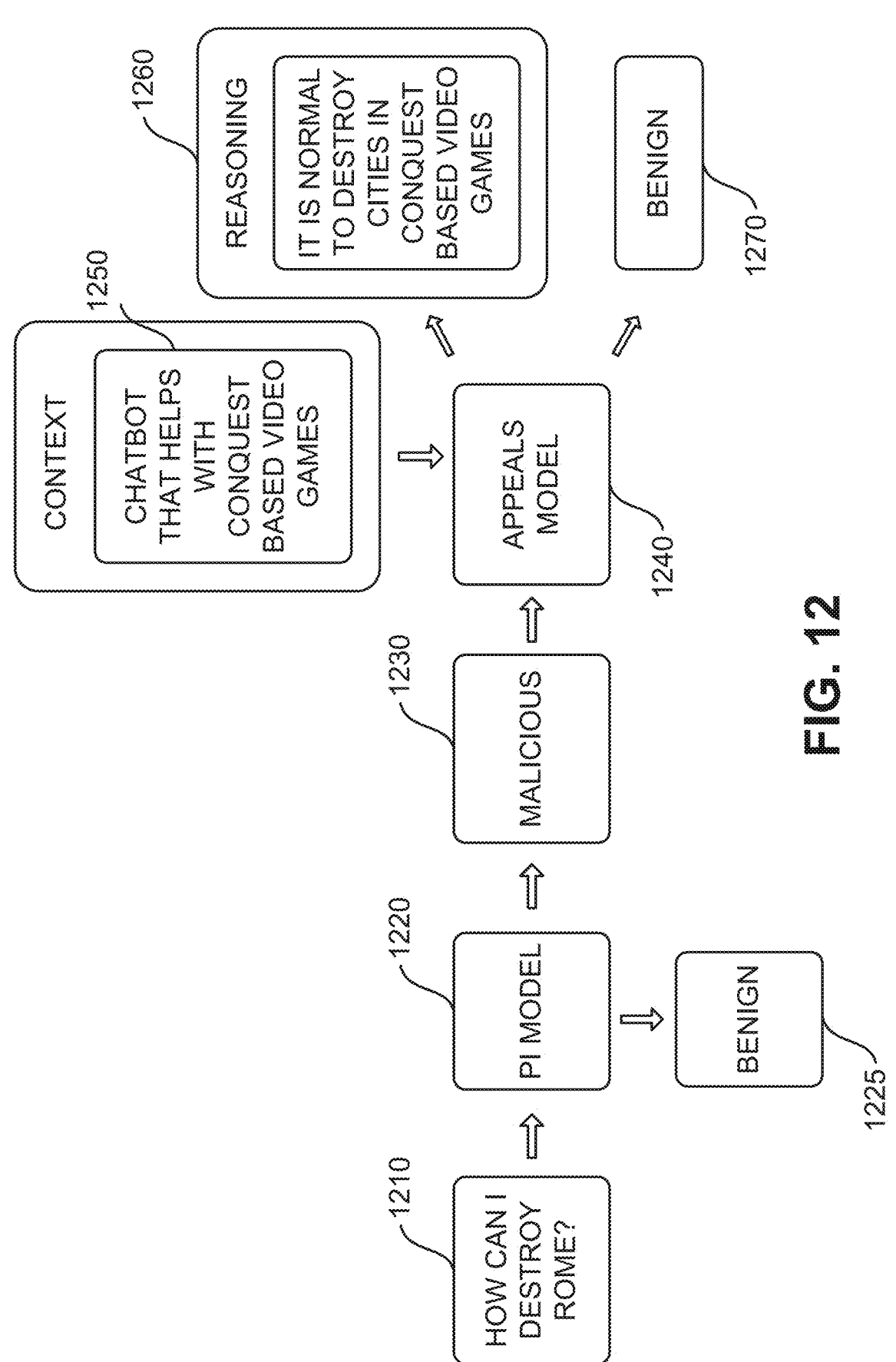
FIG. 12 is a diagram illustrating a multi-stage machine learning verdict pipeline having a first classifier and an appeals model.

FIG. 12 is a diagram which illustrates a multi-stage machine learning verdict pipeline which can assign a verdict to a sample 1210 (i.e., an input, etc.) as either being malicious or benign. The machine learning verdict pipeline can use a sequence of different, machine learning models. In the examples below, the machine learning verdict pipeline can include a prompt injection (PI) model 1220 which can make a determination, at 1230, whether the sample 1210 is malicious or benign 1235. If the sample 1210 is benign, the analysis ends and the sample 1210 is processed by the MLA 130. If the sample 1210 is deemed, by the PI model 1220 to be malicious, an appeals model 1240 using context 1250 can make a determination of whether the input 1210 is malicious (and in such cases provide reasoning 1260 for its classification) or benign 1270. In some variations, the multi-stage machine learning verdict pipeline can be executed by one or more of the query injection analyzers 192, 194 and/or by one or more of the analysis engines 152, 170.

The multi-stage machine learning verdict pipeline can leverage intelligent agents to implement some or all aspects of the workflow or other operations described herein. In this context, agents, or AI agents, are autonomous software entities that utilize advanced artificial intelligence techniques-including large language models (LLMs), reinforcement learning (including contextual bandits), planning and scheduling algorithms, and other machine learning methods—to perceive their environment (potentially across text, images, audio, video, sensor streams, and structured data), interpret complex information, make context-aware decisions under uncertainty, and execute actions to achieve objectives defined by human operators or higher-level policies.

Such agents can orchestrate end-to-end pipelines by routing requests, performing semantic task decomposition, and coordinating data flow among heterogeneous components (e.g., rule engines, retrieval systems, analytics services, and specialized ML models). They can dynamically select and parameterize models (semantic routing, few-shot configuration, prompt/program synthesis), manage tool invocation (APIs, databases, vector stores, message queues, Robotic Process Automation (RPA), robotic/IoT actuators), and adapt behavior based on intermediate results, user feedback, or changing requirements. Agents can maintain short- and long-term memory, ground reasoning via retrieval-augmented generation, and update knowledge bases while enforcing data governance, privacy, and security constraints (e.g., PII redaction, access control, secret management, key rotation, policy enforcement).

Agents can operate singly or in multi-agent systems using patterns such as manager-worker, marketplace/contract-net, blackboard, and swarm collaboration, with negotiation, role assignment, and consensus. They support human-in-the-loop review and escalation, approval workflows, and guardrails (content filtering, compliance checks, safety policies). Operational capabilities include real-time monitoring, telemetry and tracing, drift and anomaly detection, self-healing retries and fallbacks, circuit breaking, autoscaling, batching and caching, cost/latency/energy optimization, A/B testing, canary releases, and continuous training or fine-tuning. They can manage data preparation and automated feature extraction, perform simulation and sandbox testing, ensure provenance with lineage and signed attestations, and produce detailed audit logs, explanations, uncertainty estimates, and rationales appropriate for regulated environments.

Deployment contexts include cloud, on-premises, edge, and air-gapped or intermittent-connectivity settings, with support for offline modes, state checkpoints, idempotent operations, and transactional guarantees. Through these capabilities, agents enable robust, transparent, and scalable automation across discovery, decision-making, execution, and continuous improvement with minimal human intervention while preserving oversight and accountability.

In this context, "malicious" refers to any operation or input that causes the MLA 130 to behave in an unintended or undesired manner, potentially compromising system integrity, security, or functionality. When a sample 1210 is deemed malicious, automated remediation actions-such as quarantining the input, alerting system administrators, or triggering further forensic analysis—can be initiated. The multi-stage machine learning verdict pipeline can employ one or more agents to automate these remediation processes, ensuring rapid and consistent responses to detected threats. Agents can also facilitate the integration of external threat intelligence sources, dynamically update remediation strategies, and maintain comprehensive logs for compliance and auditing purposes.

If a sample 1210 is classified as benign at any stage of the multi-stage machine learning verdict pipeline, that classification can be treated as the final verdict. A benign verdict can result in the sample being ingested by the MLA 130 or passed along to other upstream or downstream processes without restriction. For example, the MLA 130 can generate an output in response to the sample, which is then provided to a downstream consuming application or process (e.g., returned to the original requestor or integrated into a larger workflow). Agents within the pipeline can automate the routing and handling of benign samples 1210, ensuring efficient throughput and minimizing latency.

As noted above, if a sample 1210 is classified as malicious by the prompt injection model 1220, it is escalated (either directly or indirectly) to a secondary system, referred to as the appeals model 1240. The appeals model 1240 has access to additional contextual information (i.e., context 1250) specific to the deployment environment and independently determines whether the sample 1210 should be considered malicious in light of this context. The verdict of the appeals model 1240 supersedes that of the PI model 1220, granting it the authority to overturn the original decision. The appeals model 1240 can take different forms including a large language model (LLM) or another advanced AI system, typically with greater capacity for contextual reasoning and semantic understanding than the PI model 1220, albeit at a higher computational cost. This approach remains efficient because only a subset of cases-those flagged as malicious by the PI model 1220—are subject to this more resource-intensive review. While the appeals model 1240, in some variations, cannot be as finely tuned for general maliciousness detection as the PI model 1220, its primary function is to assess whether the specific context 1250 justifies a benign classification, a task that requires nuanced understanding beyond the scope of the initial classifier, which can operate with limited or no contextual awareness.

The context 1250 provided to the appeals model 1240 can range from a simple system prompt-such as "A futuristic video game where war is ever-present and it is common to craft and enhance weapons"—to more sophisticated, dynamically generated context derived from external knowledge bases. For instance, the system can retrieve relevant information or articles from public or private knowledge repositories, summarize key points, and supply this synthesized context to the appeals model 1240. This enables the appeals model 1240 to make more informed, context-sensitive decisions, leveraging both explicit instructions and external data sources.

Additionally, the appeals model 1240 can generate reasoning 1260 for its decision, thereby enhancing the explainability and transparency of the verdict. This reasoning 1260 can include a summary of the contextual factors considered, the logical steps taken, and references to relevant knowledge sources. While the PI model 1220 may not be configured to provide such detailed explanations, the ability of the appeals model 1240 to articulate its reasoning offers valuable insights into the decision-making process. This capability can also be extended to other generative models in the pipeline, such as the intermediary model described below, further improving the interpretability of the system as a whole. In some cases, the appeals model 1240 can analyze the reasoning 1260 and potentially self-initiate an appeal using a different model or, the appeals model 1240 can re-evaluate and make a revised decision. Computing-costs based workflows can also be utilized in which lighter weight analyses/models are initially used and, if the reasoning is unclear or otherwise inconclusive, then more intense computing resources can be utilized. In some variations, a model may request additional context (beyond what was initially requested or otherwise obtained) if it makes a determination that more contextual information is required.

Figure 13:
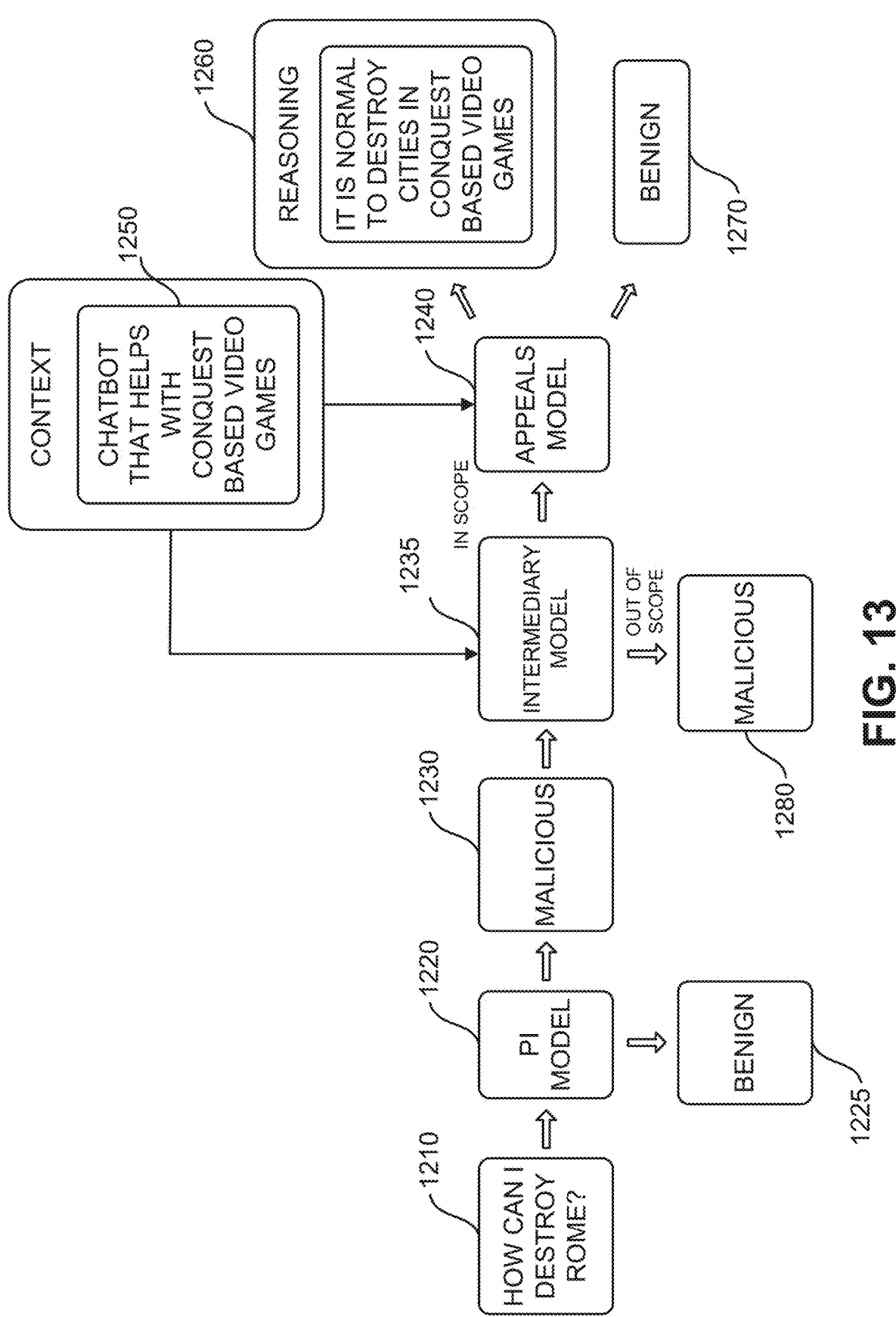
FIG. 13 is a diagram illustrating a multi-stage machine learning verdict pipeline having a first classifier, an intermediary model, and an appeals model.

With reference to FIG. 13, in some implementations as a variation to the architecture of FIG. 12, an intermediary model 1235 (sometimes referred to as a context-gating model) can be introduced between the PI model 1220 and the appeals model 1249. This intermediary model 1235 can be configured to specialize in determining whether the sample 1210 is genuinely relevant to the application's context 1250. If the sample 1210 is deemed contextually relevant by the intermediary model 1235 (i.e., the confidence level is above a certain threshold, etc.), the sample 1210 is forwarded to the appeals model 1240 for further review; otherwise, the initial maliciousness verdict (i.e., classification) is upheld 1280. The intermediary model 1235 can be characterized as a 'bureaucrat' agent, responsible for validating the legitimacy of appeal requests and ensuring that only appropriate cases are escalated to the computationally expensive appeals model 1240 for contextual analysis. The PI model 1220 can have a similar structure and functionality as that of PI model 1220.

The primary distinctions between the PI model 1220 and the appeals model 1240 lies in their design and training methodologies. The PI model 1220 can typically be trained to detect malicious content across a wide range of scenarios, optimized for high-throughput, low-latency operation, and cannot, in most cases, incorporate contextual information due to the computational overhead of doing so at scale. In contrast, the appeals model 1240 can utilize a more general-purpose model-such as a large language model-focused on deep language understanding and contextual reasoning. Its task is to evaluate whether, given the specific context 1250, the sample 1210 is appropriate or benign. The appeals model 1240 can be further fine-tuned for particular deployment contexts, though this introduces additional training and maintenance costs.

A key advantage of this architecture is that the addition of the appeals model 1240 enables dynamic context updates without necessitating retraining of the underlying models (i.e., the PI model 1220, etc.). Unlike the PI model 1220, which would likely require retraining to accommodate new or changing contexts-potentially sacrificing generality—the appeals model 1240 can accept context 1250 as an input parameter. This allows the same system to be deployed across multiple clients or environments, each with distinct contextual requirements, without modifying the models or incurring additional operational costs or performance degradation.

The models 1220, 1235, 1240 employed in this pipeline can encompass a variety of machine learning architectures, including traditional classifiers, large language models (LLMs), or multi-modal models capable of processing text, images, audio, or combinations thereof. The intermediary model 1235 and the appeals model 1240 can be implemented as general-purpose LLMs or further fine-tuned for specific applications or contexts. Deployment options include running models locally for enhanced privacy and control or accessing them via APIs from foundational model providers to leverage state-of-the-art capabilities and scalability.

Various techniques can be used to train the models provided herein. The following is with regard to the assembly of a dataset and various preprocessing operations which can be conducted prior to model training. Access to a dataset comprising triplets $(x\_i, y\_i, c\_i)$ is assumed, where $x\_i$ represents the input sample to be analyzed, $y\_i$ is the corresponding ground truth label (e.g., benign or malicious), and $c\_i$ denotes the context associated with the application, which can or cannot be directly related to $x\_i$. While $x\_i$ and $y\_i$ are required for all samples, $c\_i$ can be absent (i.e., None) for certain entries, allowing for flexible training scenarios.

The dataset can include, for example, benign conversations between humans and chatbots, records of malicious prompt injection attempts, or toxic interactions with conversational agents. Contextual information ($c\_i$) can specify the operational environment, such as healthcare, gaming, or software development. The data can also encompass interactions between automated agents, between agents and human users, or other multi-agent scenarios, supporting a wide range of application domains.

Input samples ($x\_i$) can take various forms, including numerical vectors, text, images, audio, or any combination thereof. In some cases, the input can represent a sequence of interactions, such as an entire conversation between a human and a chatbot, encompassing both user requests and model responses. Preprocessing steps can involve tokenization, feature extraction, or transformation into embedded representations using pre-trained models. These steps can be performed either as part of a dedicated preprocessing pipeline or within the model architecture itself, enabling flexible and efficient handling of diverse input modalities.

Prior to model ingestion, input data can undergo preprocessing to normalize sample distributions, remove outliers, or enhance feature representations. Techniques such as standardization, dimensionality reduction, or data augmentation can be applied to improve model robustness and generalization.

The PI model 1220 (which can also referred to as a prompt injection detector, toxicity classifier, the MLA 160 or similar labels) can be a machine learning classifier trained to assign a label $y\_i$ to an input $x\_i$. Training data can include pairs $(x\_i, y\_i)$, where $x\_i$ represents the user-provided input and $y\_i$ denotes the corresponding class label (e.g., 0 for benign, 1 for malicious). In this configuration, the PI model 1220 operates without access to contextual information, focusing solely on the intrinsic properties of the input sample.

In some variations, the PII model 1220 can take as input $(x\_i, o\_i)$, where $o\_i$ is the response the MLA 160 would output if the MLA 160 is unprotected or if $x\_i$ is deemed to be safe/benign. Such an arrangement is advantageous in that the user request as well as the MLA behavior can be analyzed.

Alternatively, the PI model 1220 can be trained with contextual information, using datasets of the form $(x\_i, y\_i, c\_i)$. In this setup, both the input sample and its associated context are provided to the PI model 1220, either by concatenating raw inputs or by generating embedded representations ($x\_e\_i$ for the input, $c\_e\_i$ for the context).

Embeddings can be produced using a shared or separate embedding model, and combined via concatenation, element-wise addition, or multiplication, provided the vectors are of compatible dimensions. During training, context masking can be employed to expose the model to both context-aware and context-agnostic scenarios, with label adjustments as necessary to reflect the intended learning objectives.

Training of the PI model 1220 can utilize stochastic gradient descent (SGD) with adaptive optimizers such as Adam. For binary classification tasks, the loss function can be binary cross-entropy, while categorical cross-entropy is used for multi-class problems. If the model is configured for regression (predicting continuous values), mean squared error (MSE) or similar loss functions can be applied.

In some variations, the PI model 1220 can be initialized from a pre-trained foundation model-such as a large language model- and subsequently fine-tuned for the specific classification task. Alternatively, the model can be trained from scratch using domain-specific data, depending on the availability of resources and the desired level of task specialization.

The PI model 1220 can also be implemented as a pre-trained language model optimized for human interaction, potentially enhanced via reinforcement learning with human feedback (RLHF) to improve instruction following and response quality. In such cases, the classification task can be framed as a system prompt, guiding the model to analyze the input and produce a verdict. Prompts can include explicit instructions or a few illustrative examples to enable few-shot or zero-shot learning. The prompt can or cannot incorporate contextual information, depending on the desired operational mode. For example, a system prompt can read: "Your task is to determine whether the PROMPT below is malicious or benign in the following CONTEXT: . . . "

If the PI model 1220 is a generative model, it can also produce an explanation of its reasoning, either as an explicit output or as part of its internal chain-of-thought processes. This capability can enhance interpretability and provide valuable insights into the decision-making criteria of the PI model 1220.

The intermediary model 1235, which can be characterized as an in-context bureaucrat, can be trained using a dataset consisting of triplets $(x\_i, y\_i, c\_i)$, where $x\_i$ represents the input sample, $y\_i$ is the label indicating whether the input is within the context $c\_i$, and $c\_i$ is the associated context. The output $y\_i$ can indicate if the input $x\_i$ is contextually relevant to $c\_i$, or can include an additional label such as 'unknown.' In some configurations, $y\_i$ can also represent a numeric distance or similarity score between $x\_i$ and $c\_i$.

Inputs to the intermediary model 1235 can be processed in several ways. The raw input $x\_i$ and context $c\_i$ can be concatenated into a single input sequence, or embedded representations $x\_e\_i$ and $c\_e\_i$ can be generated using either a shared or separate embedding model. These embeddings can be combined through concatenation, element-wise addition, multiplication, or other vector operations, provided the dimensions are compatible. This approach enables the model to jointly reason over both the input and its context.

The intermediary model 1235 can also incorporate the output of the PI model 1220, including its verdict and any associated reasoning or explanation. These outputs can be treated as additional features, concatenated or otherwise integrated with the input and context representations. Training can be performed using stochastic gradient descent with optimizers such as Adam. For classification tasks, binary cross-entropy or categorical cross-entropy loss functions can be used, while regression tasks (such as predicting a similarity score) can utilize mean squared error or similar loss functions.

In some variations, the intermediary model 1235 can be implemented as a similarity-based model, where both the input x_i and context c_i are embedded into a shared vector space and a similarity metric (such as dot product or cosine similarity) is computed. If the similarity score exceeds a predefined threshold, the input is considered in-context; otherwise, it is out-of-context. Embeddings can be generated using external models, and architectures such as two-tower models or other similarity-based frameworks can be employed.

The intermediary model 1230 can also be realized as a pre-trained large language model, potentially enhanced through reinforcement learning with human feedback, and configured to perform context relevance classification via system prompts. Prompts can include explicit instructions and, optionally, few-shot or zero-shot examples. The system prompt can incorporate both the input and the context, for example: "Your task is to determine whether the PROMPT below is related to the following CONTEXT:

If the intermediary model 1230 is a generative model, it can be configured to output an explanation of its reasoning, either as an explicit response or as part of its internal chain-of-thought processes. This capability enhances interpretability and provides transparency into the model's decision-making process.

The appeals model 1240 can be trained using a dataset of triplets (x_i, y_i, c_i), where x_i represents the input sample, y_i is the final verdict label or value, and c_i is the associated context. The model can take as input both the sample and its context, either by concatenating the raw inputs or by generating embedded representations (x_e_i for the input, c_e_i for the context). Embeddings can be created using a shared or separate embedding model, and combined through concatenation, element-wise addition, multiplication, or other vector operations, provided the dimensions are compatible. This approach enables the model to jointly reason over both the input and its context.

The appeals model 1240 can also incorporate the outputs of the first model 1220 and/or the intermediary model 1230, including their verdicts and any associated reasoning or explanations. These outputs can be treated as additional features and concatenated or otherwise integrated with the input and context representations, allowing the appeals model to leverage the full decision history and supporting information from earlier stages in the pipeline.

Training of the appeals model 1240 can utilize stochastic gradient descent with optimizers such as Adam. For classification tasks, binary cross-entropy or categorical cross-entropy loss functions can be used, while regression tasks (such as predicting a similarity score or distance) can utilize mean squared error or similar loss functions.

In some variations, the appeals model 1240 can be implemented as a pre-trained large language model, potentially enhanced through reinforcement learning with human feedback, and configured to perform final verdict classification via system prompts. Prompts can include explicit instructions and, optionally, few-shot or zero-shot examples. The system prompt can incorporate both the input and the context, for example: "Your task is to determine whether the PROMPT below is malicious or benign in the following CONTEXT: . . . "

If the appeals model 1240 is a generative model, it can be configured to output an explanation of its reasoning, either as an explicit response or as part of its internal chain-ofthought processes. This capability enhances interpretability and provides transparency into the model's decision-making process.

Each of the models 1220, 1230, and 1240 can be trained independently and optimized for its specific task, or they can be jointly trained. In the case of joint training, a joint weighted loss function can be used, which is the sum of the loss functions for each model, weighted by calibration factors. Alternatively, joint training can be performed by freezing all models except the one currently being trained and alternating training among the models until the desired performance is achieved.

Figure 14:
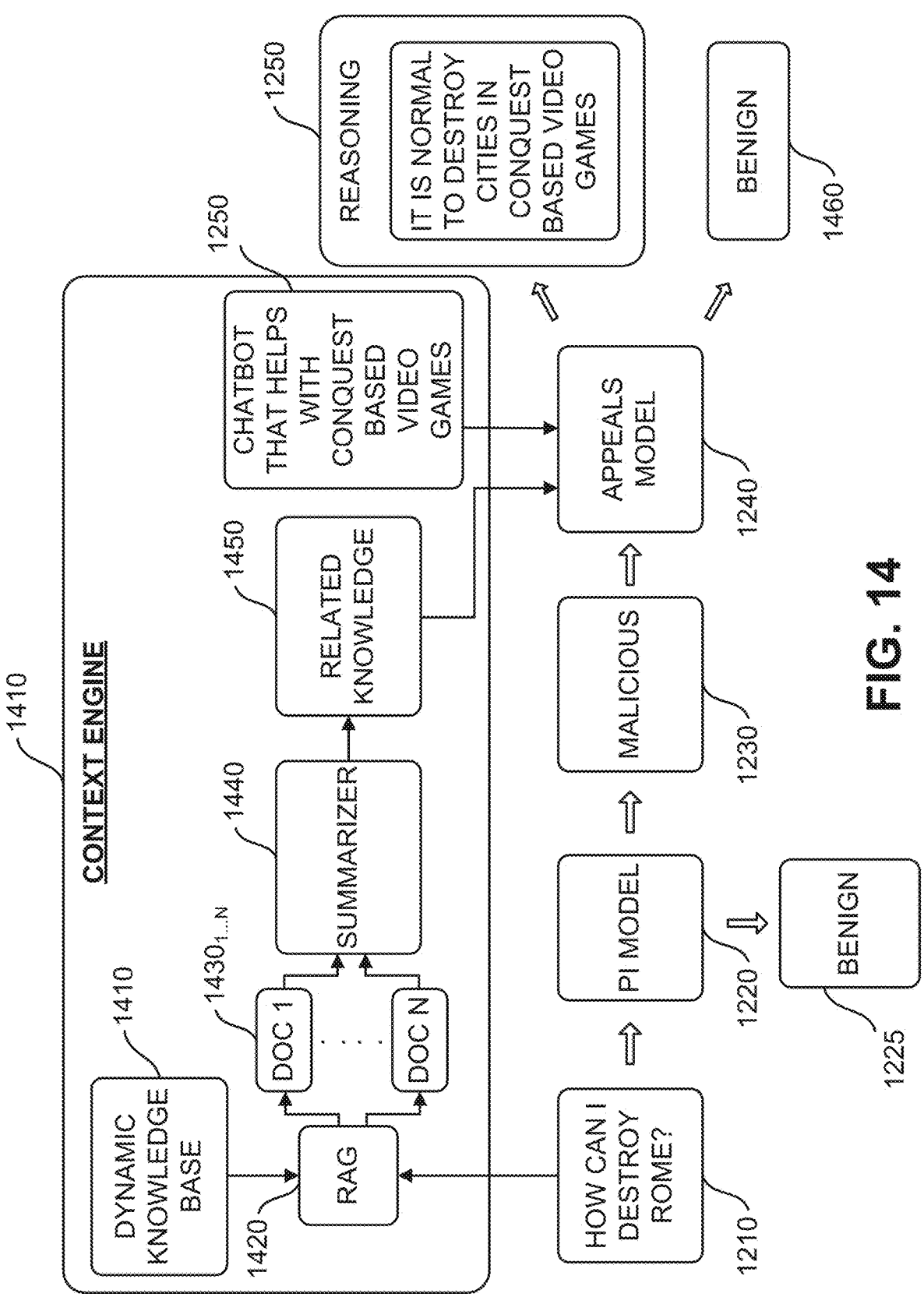
FIG. 14 is a diagram illustrating a multi-stage machine learning verdict pipeline having a first classifier and an appeals model with the appeals model receiving context from a context engine.
Figure 15:
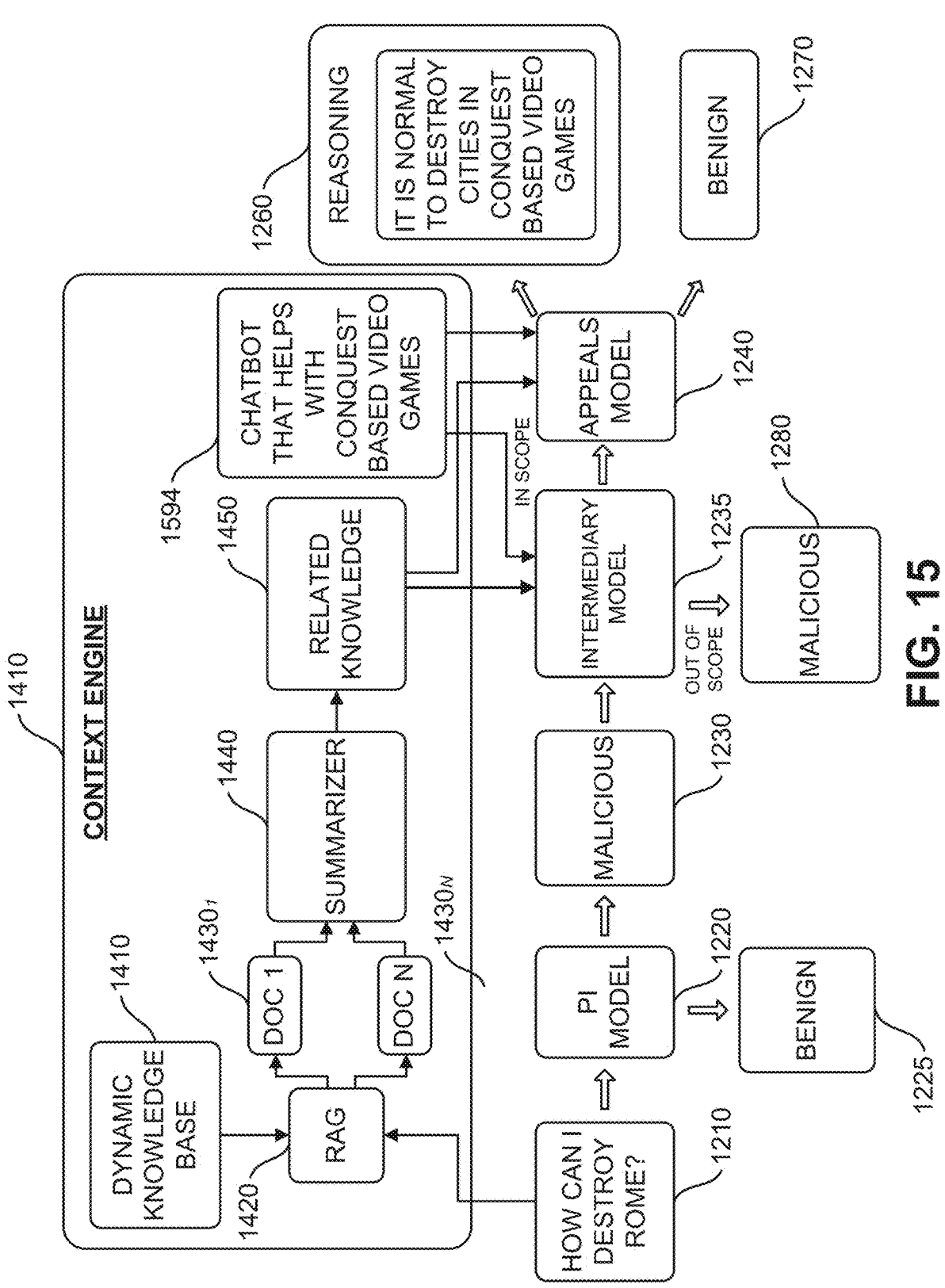
FIG. 15 is a diagram illustrating a multi-stage machine learning verdict pipeline having a first classifier, an intermediary model, and an appeals model with both of the intermediary model and the appeals model receiving context from a context engine.

With reference to FIGS. 14, and 15, a context engine 1410 can form part of the multi-stage machine learning verdict pipeline and be responsible for dynamically generating, retrieving, and processing contextual information (c_i) that is supplied to the various models (1220, 1235, 1240) in the pipeline. The context c_i can be static-such as a fixed description of the application domain- or dynamically constructed based on the characteristics of the input sample (x_i) and the operational environment.

In the variation of FIG. 14, the context engine 1410 provides contextual information to the appeals model 1240. In the variation, the context engine 1410 provides contextual information to both of the intermediary model 1235 and the appeals model 1240.

From a technical perspective, the context engine 1410 can leverage a variety of architectures and algorithms to identify and retrieve relevant context. For example, the engine can utilize embedding-based retrieval systems, where both the sample 1210 and candidate context documents are embedded into a shared high-dimensional vector space using pre-trained or fine-tuned language models (such as BERT, Sentence Transformers, or domain-specific encoders). Similarity metrics, such as cosine similarity or dot product, can be computed between the embedded representations of the input and potential context sources. The engine can then select the most relevant context(s) based on a similarity threshold or top-k ranking, or other similarity metrics.

The context engine 1410 can interface with internal or external knowledge bases 1420, including proprietary databases, documentation repositories, or the open internet. In a typical workflow, when a new sample 1210 is received, the context engine 1410 can perform a semantic search over the knowledge base 1420 to retrieve documents 14401 . . . . N (e.g., web pages, articles, other data points, etc.) that are most relevant to the sample 1210 to ultimately define related knowledge 1460. Retrieved context (i.e., information from the documents 14401 . . . . N, etc.) can be further processed using additional machine learning models or agents. In one example, a summarizer 1460 can provide a high-level summary of the documents 14401 . . . . N. The additional machine learning models or agents can, in addition or in the alternative, also undertake different operations such as filtering or re-ranking of the 14401 . . . . N. This configuration enables the system to provide concise, high-quality context to downstream models, improving the accuracy and relevance of verdicts.

The context engine 1410 can also support advanced retrieval-augmented generation (RAG) workflows 1430 in which retrieved context is incorporated into the prompts or input sequences for large language models or other generative models in the pipeline. Agents can orchestrate the retrieval, selection, and integration of context, ensuring that each model in the pipeline receives the most appropriate and up-to-date information for its specific task. The context 1410 engine can be configured to provide different context c_i to each model stage, or to maintain consistency by supplying the same context across the pipeline, depending on the requirements of the application.

To ensure robust and scalable operation, the context engine 1410 can employ distributed search architectures, caching strategies, and real-time monitoring. It can also maintain audit logs of context retrievals and similarity scores for compliance and explainability. The engine can be further enhanced with feedback loops, where the performance of downstream models informs the retrieval and ranking strategies, enabling continuous improvement of context selection.

Overall, the context engine 1410 serves as an intelligent, adaptive bridge between raw input data and the contextual knowledge required for accurate, context-aware decision-making throughout the multi-stage machine learning verdict pipeline.

Figure 16A:
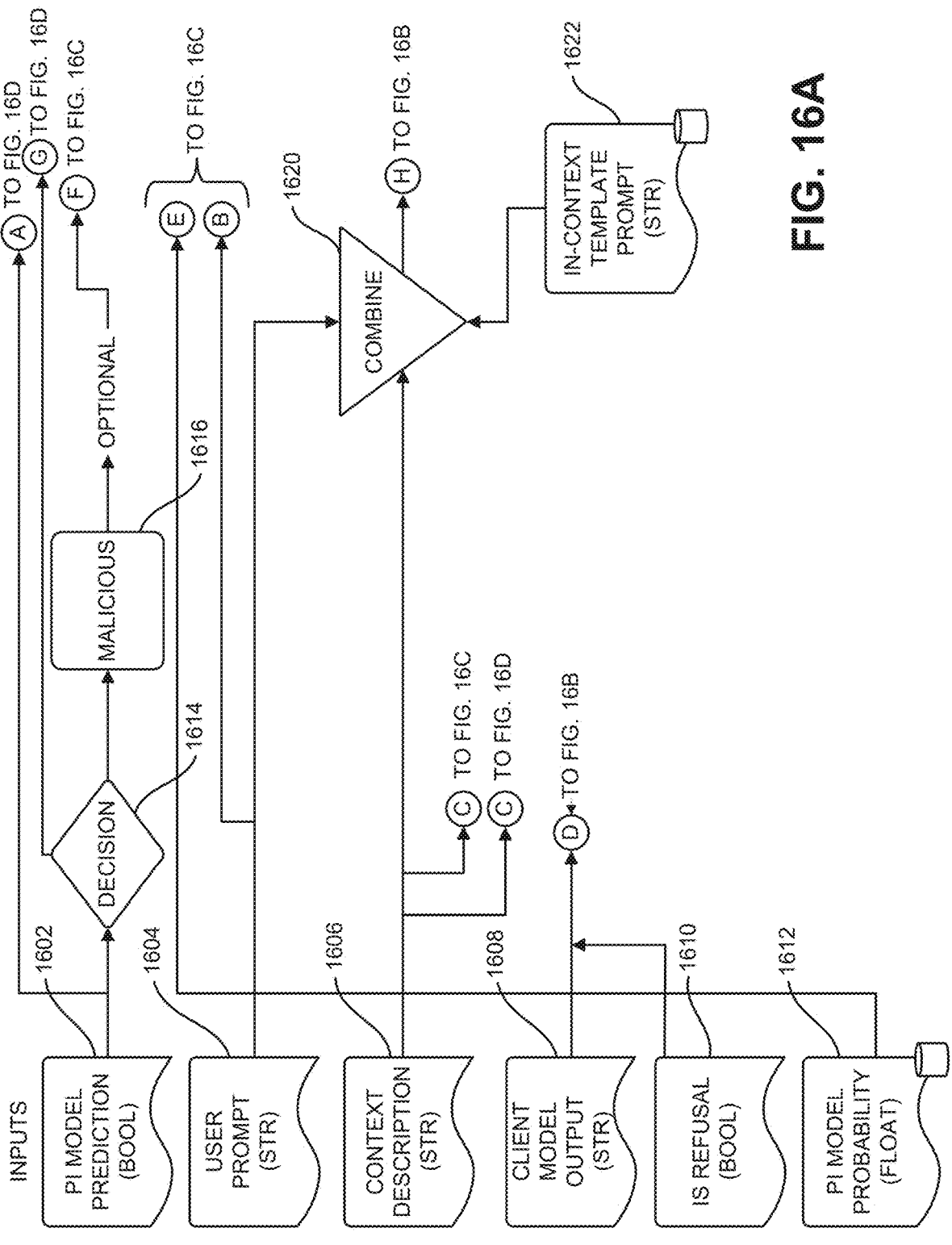
FIGS. 16A-D are diagrams collectively illustrating an end-to-end policy-aware classification pipeline that spans gating, appeals, consolidation, and final decisioning.
Figure 16B:
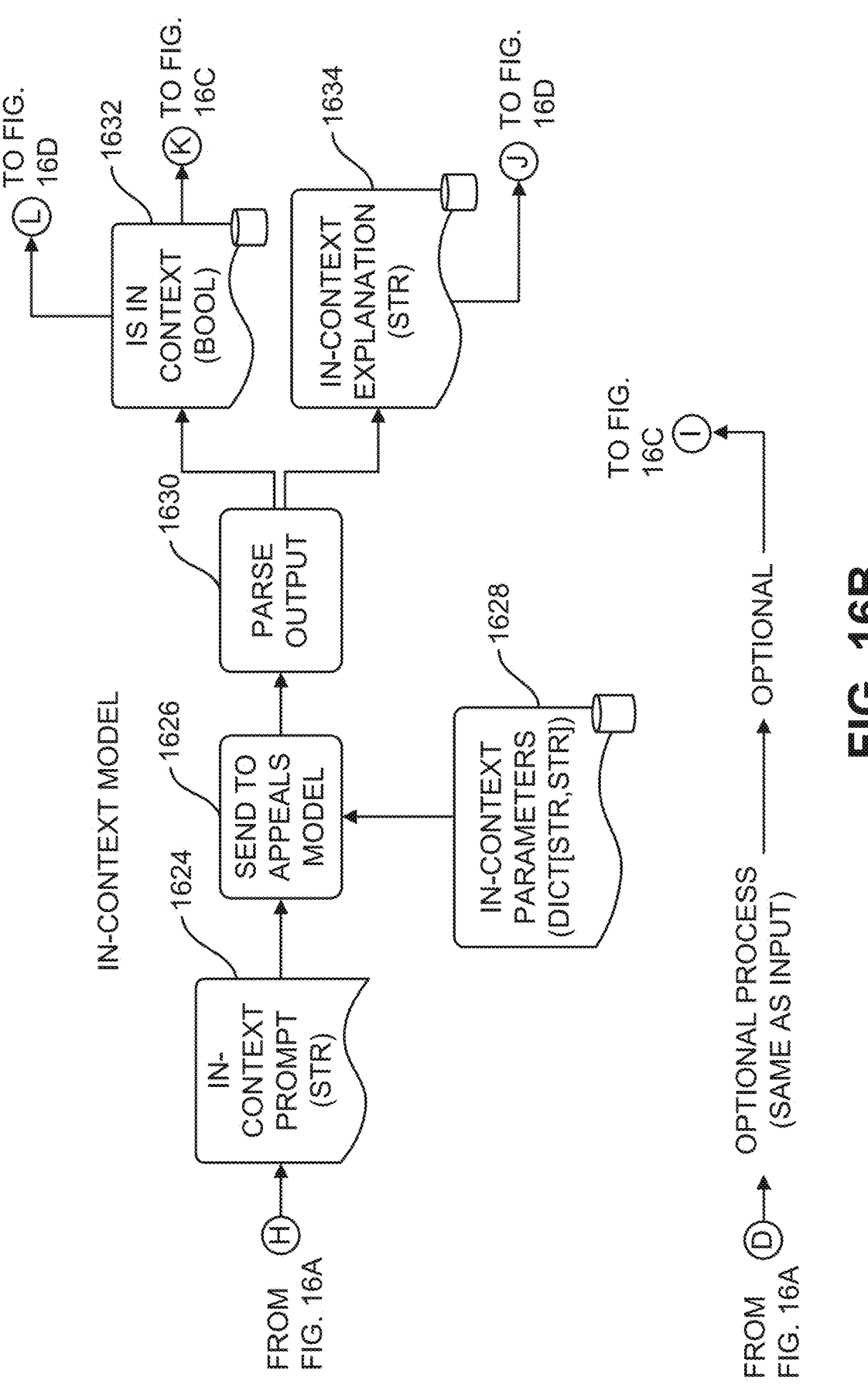
Figure 16C:
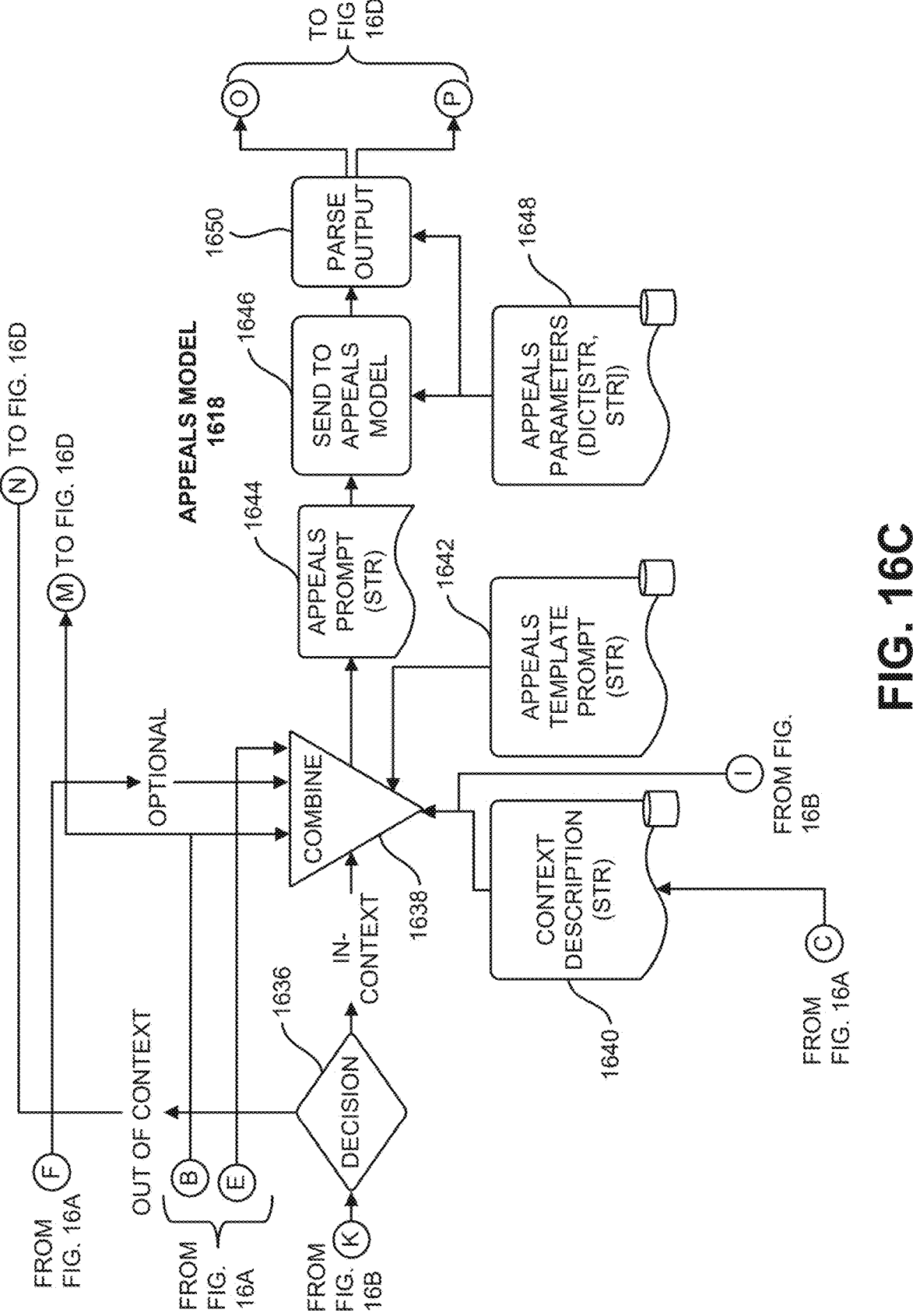
Figure 16D:
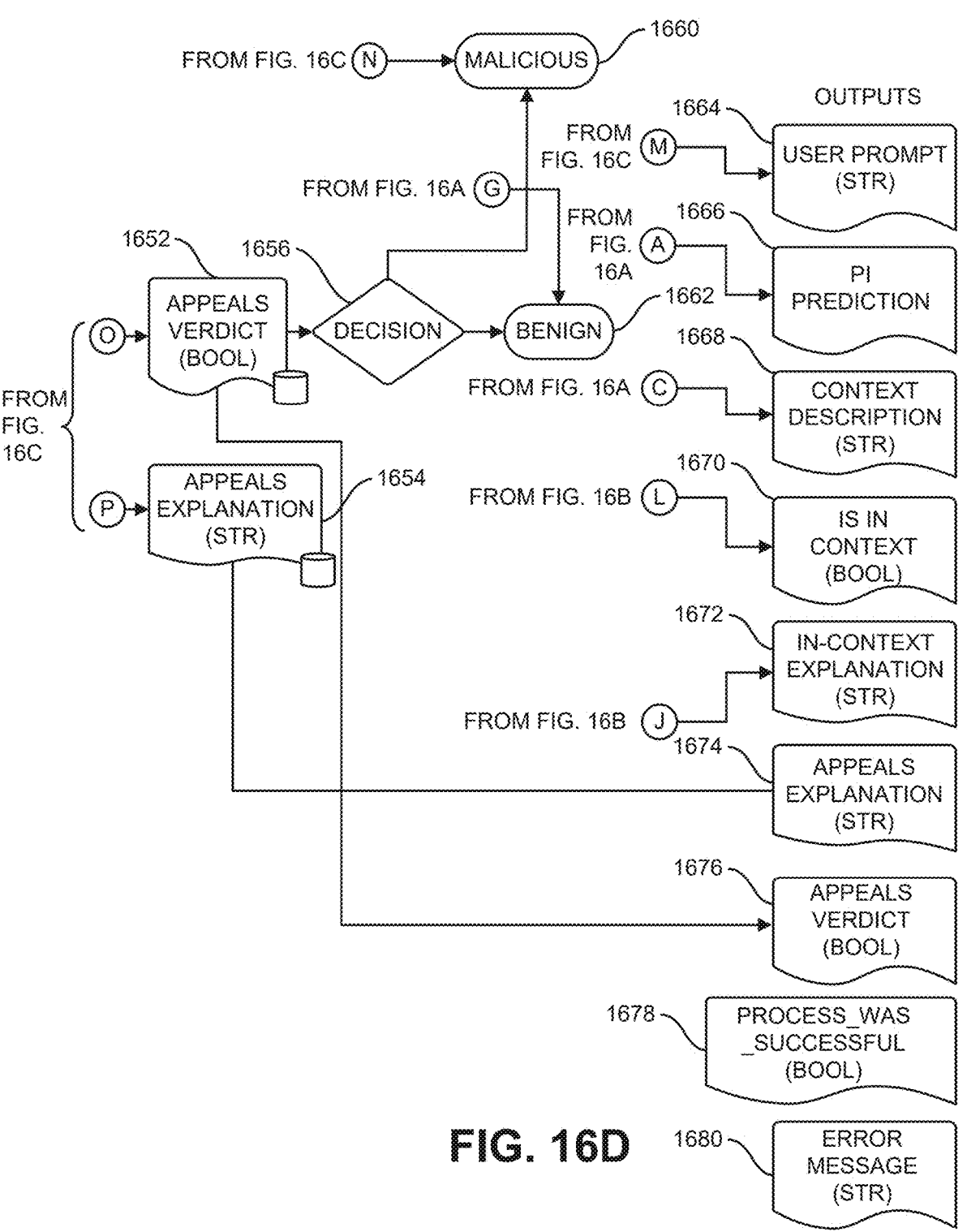

FIGS. 16A-16D collectively depict a single, multi-page figure (FIG. 16) presenting an end-to-end policy-aware classification pipeline that spans gating, appeals, consolidation, and final decisioning. Different aspects of the FIG. 16 workflow can be implemented by or otherwise using agents. In FIG. 16A, an in-context gating workflow prepares and evaluates a suspected-malicious sample for contextual relevance prior to any appeals adjudication. FIG. 16B illustrates construction and execution of an appeals prompt that is conditioned on the in-context determination of FIG. 16A and thus continues the single, multi-page FIG. 16. FIG. 16C continues FIG. 16 by consolidating signals and assembling standardized outputs for downstream enforcement. FIG. 16D concludes the single, multi-page FIG. 16 by applying final decision logic to the consolidated signals from FIGS. 16A-16C.

With reference again to FIG. 16A, inputs can take various forms including one or more of (i) a prompt injection model prediction 1602 (which can be Boolean in that it indicates whether or not a sample is malicious and inform decision 1614), (ii) a probability, (iii) a logit (iv) a user prompt 1602 (which can be, for example, an alphanumeric string), (v) a context description 1606 (which can be, for example, an alphanumeric string providing some context for the prompt such as video game environment, etc.), (vi) a client model output 1608 which can, for example, be an alphanumeric string generated in response to the input of a sample into a model, (vii) an IS refusal Boolean 1610 indicating that the model has refused to provide a response to the request—this information can be used to downstream to determine whether to subject the sample to the appeals model 1618 or otherwise use the sample as part of an appeal, and/or a (viii) a prompt model probability 1612 which can indicate the likelihood of a sample being malicious and be expressed using a floating point-type data. The user prompt 1604 and the context description 1606 can be combined, at 1602, along with an in-context template prompt 1622, which can be used to generate an in-context prompt 1624 (as illustrated in FIG. 16B). The outputs of FIG. 16A—namely, signals 1602-1612, artifacts 1614-1622, and labels 1624-1626—are forwarded to the appeals construction stage of FIG. 16B and, ultimately, to consolidation and decisioning in FIGS. 16C-16D, preserving continuity across the pages of FIG. 16. This in-context prompt 1624 can be input, at 1626, into an appeals model 1618 (e.g., an LLM, etc.) along with any in-context parameters 1628. The output of the appeal model can be parsed (according to a pre-defined schema, etc.), at 1630, to determine at 1632, whether the sample is in context and, in addition, to generate, at 1634, an in-context explanation 1634.

With reference to FIG. 16C, a determination is made, at the 1636, that the sample is in context which results in a combination of various contextual information which can be used to generate an appeals prompt 1644. The information combined, at 1638, can include various aspects including the decision of whether the sample is in-context, the user prompt 1604, the PI model probability 1612, information characterizing the malicious decision 1616, the context description 1640, the model output responsive to the prompt 1608, the appeals template prompt 1642 and the like. The combination of information is used to generate an appeals prompt 1644 which is sent, at 1646, along with appeal parameters 1648, the appeals model 1619. The output of the appeals model 1618 is parsed, at 1650, using, the appeal parameters 1648.

With reference to FIG. 16D, the parsed output (1650) is used to generate an appeals verdict 1652 and an accompanying appeals explanation 1654 so that, at 1656, a decision can be made as to whether the sample is malicious 1660 or benign 1662. The workflow of FIGS. 16A-D can generate various outputs for consumption by downstream applications or processes. For example, the output can include one or more of: the user prompt 1664, the prediction of the PI model 1666 (which may differ from the appeals model verdict), the context description 1668, an indication of whether the sample is in context 1670, the in-context explanation 1672, an appeals explanation 1674, and the like.

FIG. 17 is a process flow diagram illustrating the reduction of false positive classifications for machine learning model inputs or outputs in which, at 1710, a sample is received which is associated with operation of a machine learning model. Thereafter, at 1720, a first classifier generates a first verdict classifying the sample as benign or malicious. The first verdict is emitted, at 1730, (i.e., provided to a consuming application or process, etc.) as a final verdict if the first verdict indicates that the sample is benign. Otherwise, if the first verdict indicates that the sample is malicious, an appeals model is invoked, at 1740. The appeals model is configured to ingest contextual information describing a deployment context of the machine learning model (along with the sample). The intermediary model generates, at 1750, a second verdict classifying the sample as benign or malicious based on the contextual information. This second verdict is emitted, at 1760, as the final verdict for the sample in preference to the first verdict. Various remediation actions can be undertaken if the sample is deemed to be malicious (e.g., preventing the sample from being ingested by the machine learning model, modifying the sample prior to ingestion by the machine learning model, preventing an output of the machine learning model (comprising the sample or responsive to the sample) from being returned to a requestor, modifying an output of the machine learning model, etc.).

Figure 18:
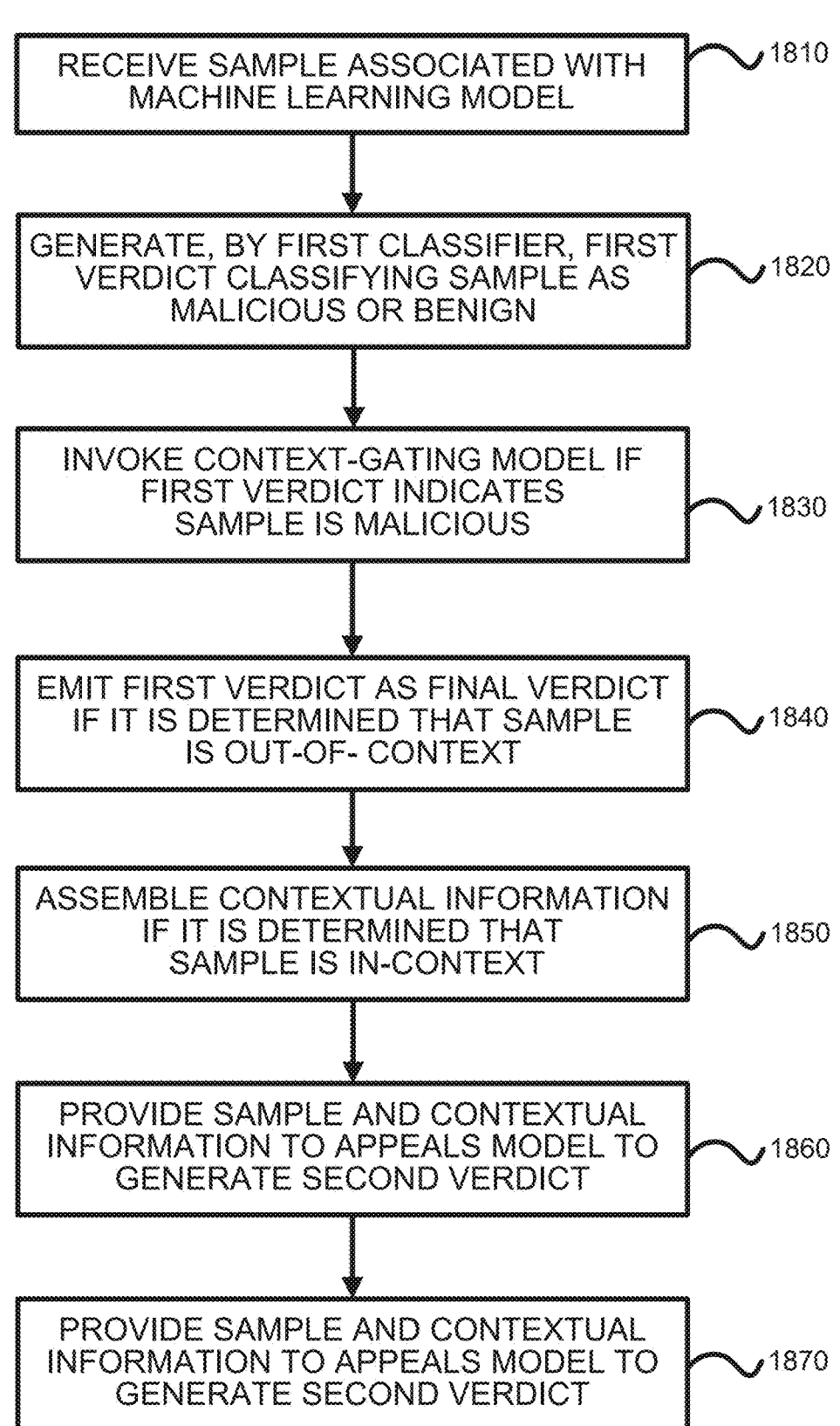
FIG. 18 is a process flow diagram illustrating a second technique for false positives in machine learning model output classifications.

FIG. 18 is a process flow diagram for adjudicating suspected-malicious samples with context gating, in which, at 1810, a sample is received. Thereafter, at 1820, a first-stage classifier generates a first verdict classifying the sample as benign or malicious. If the first verdict indicates that the sample is malicious, a context-gating model distinct from the first-stage classifier and an appeals model is, at 1830, invoked so that such context-gating model can evaluate whether the sample is in-context for a specific application domain. The first verdict is emitted, at 1840, if the context-gating model determines the sample is out-of-context. If the context-gating model determines the sample is in-context, contextual information is assembled, at 1850, by retrieving, via a similarity search over a knowledge base, one or more items related to the sample. The sample and the contextual information are provided, at 1860, to the appeals model to generate a second verdict. The second verdict is emitted, at 1870, as the final verdict (in preference to or otherwise overriding the first verdict).

Various implementations of the subject matter described herein can be realized in digital electronic circuitry, integrated circuitry, specially designed application-specific integrated circuits (ASICs), field-programmable gate arrays (FPGAs), tensor processing units (TPUs), neural processing units (NPUs), or other artificial intelligence (AI) accelerators, computer hardware, firmware, software, and/or any combination thereof. Implementations can execute on heterogeneous, distributed, and/or virtualized computing environments, including on-premises systems, cloud platforms (public, private, hybrid, multi-cloud), edge and fog nodes, mobile and embedded devices, and Internet-of-Things (IoT) endpoints. Implementations can be embodied in one or more computer programs or non-transitory computer program products executable and/or interpretable on a programmable system including at least one programmable processor (e.g., central processing unit (CPU), graphics processing unit (GPU), digital signal processor (DSP), tensor processing unit (TPU), neural processing unit (NPU)), which can be special- or general-purpose, coupled to receive data and instructions from, and to transmit data and instructions to, one or more storage systems, input devices, and output devices.

These computer programs (also referred to as programs, software, applications, services, microservices, functions, or code) include machine instructions for a programmable processor and can be implemented in high-level, procedural, object-oriented, functional, reactive, dataflow, and/or scripting languages; domain-specific languages; and/or assembly or machine languages. Programs can include hardware description languages (e.g., hardware description languages such as Verilog, VHSIC Hardware Description Language (VHDL), System Verilog) and accelerator programming models (e.g., Open Computing Language (OpenCL), SYCL). As used herein, "machine-readable medium" refers to any non-transitory computer program product, apparatus, and/or device (e.g., magnetic disks, optical disks, solid-state drives, random access memory (RAM), read-only memory (ROM), Flash, electrically erasable programmable read-only memory (EEPROM), non-volatile memory express (NVMe), three-dimensional XPoint (3D XPoint), magnetoresistive random-access memory (MRAM), phase-change random-access memory (PCRAM), and programmable logic devices (PLDs)) used to provide machine instructions and/or data to a programmable processor, including via a machine-readable signal. The term "non-transitory" as used herein excludes transitory propagating signals per se, but does not exclude information stored on non-transitory media. A "machine-readable signal" refers to any signal used to provide machine instructions and/or data to a programmable processor, including wired and wireless signals.

Storage systems can include volatile and non-volatile memory; local, network-attached, and distributed storage; file, block, and object stores; databases (relational, non-relational (NoSQL), graph, time-series), data warehouses, and data lakes. Processing and storage can be organized using virtualization and isolation technologies including hypervisors, virtual machines, containers, container orchestration systems, serverless functions, sandboxes, unikernels, and WebAssembly runtimes. Deployment and lifecycle management can utilize infrastructure-as-code, configuration management, continuous integration/continuous deployment (CI/CD) pipelines, and observability tooling (logging, metrics, tracing). Implementations can leverage security hardware and services such as trusted platform modules (TPMs), hardware security modules (HSMs), secure enclaves/trusted execution environments (TEEs), cryptographic modules, and identity and access management systems; and can employ encryption in transit and at rest, attestation, code signing, and secure boot.

To provide for interaction with a user, the subject matter can be implemented on devices with displays (e.g., light-emitting diode (LED), liquid crystal display (LCD), organic light-emitting diode (OLED), electronic ink (e-ink), augmented reality (AR), virtual reality (VR), mixed reality (MR) headsets) and input mechanisms (e.g., keyboard, mouse, trackball, touchpad, touchscreen, stylus, game controller, remote control). Additional input and feedback modalities can include microphones, speakers, cameras, depth sensors, biometric sensors, haptic devices, eye tracking, gesture recognition, voice assistants, and brain-computer interfaces. Feedback can be visual, auditory, haptic, or multimodal. Implementations can support accessibility features (e.g., screen readers, captioning, alternative input).

The subject matter can be implemented in a computing system including back-end components (e.g., data servers, storage clusters, compute clusters, artificial intelligence (AI) training/inference services), middleware components (e.g., application servers, message brokers, application programming interface (API) gateways, event streams), and/or front-end components (e.g., client applications, web browsers, mobile applications (apps), thin clients), or any combination thereof. Components can be interconnected by any form or medium of digital data communication, including wired and wireless networks and protocols such as Ethernet, Infini-Band, controller area network (CAN) bus, wireless fidelity (Wi-Fi), Bluetooth/Bluetooth Low Energy (BLE), near-field communication (NFC), Zigbee, Z-Wave, long range (LoRa)/LoRa wide area network (LoRaWAN), cellular (third generation (3G), fourth generation (4G), fifth generation (5G), sixth generation (6G)), satellite, mesh networks, and the Internet. Protocols can include transmission control protocol/internet protocol (TCP/IP), user datagram protocol (UDP), quick UDP internet connections (QUIC), hypertext transfer protocol (HTTP/2-HTTP/3), WebSockets, gRPC (gRPC remote procedure calls), message queuing telemetry transport (MQTT), advanced message queuing protocol (AMQP), constrained application protocol (CoAP), and industrial protocols. Systems can employ software-defined networking, load balancing, content delivery networks, caches, and time synchronization (e.g., network time protocol (NTP), precision time protocol (PTP)). Processing can occur centrally, at the edge, on-device, or in federated and/or privacy-preserving arrangements, and can support online, offline, batch, streaming, and real-time modes.

The computing system can include clients, servers, and other interconnected components that may be distributed across various physical or virtual locations. Clients and servers can be remote from each other and typically interact through one or more communication networks, which can include local area networks, wide area networks, the Internet, or wireless and mobile networks. Clients can include desktop computers, laptops, mobile devices, web browsers, thin clients, IoT devices, or edge nodes, while servers can include physical or virtual machines, cloud-based instances, microservices, containers, or serverless functions. The client-server relationship can be established by computer programs running on the respective devices, enabling communication, data exchange, and service orchestration. Modern computing environments can support multiple tiers and roles, such as peer-to-peer, edge-to-cloud, and hybrid architectures, where clients and servers may dynamically assume different roles, participate in distributed processing, and interact with middleware, APIs, and other services. These systems can leverage load balancing, failover, replication, and autoscaling to provide robust, scalable, and resilient operation across diverse deployment models.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for adjudicating suspected-malicious samples with context gating, the method comprising:

receiving, by one or more computing devices, a sample;

generating, by a first-stage classifier, a first verdict classifying the sample as malicious;

invoking a context-gating model distinct from the first-stage classifier and an appeals model, the context-gating model evaluating whether the sample is in-context for a specific application domain by computing an embedding for the sample and an embedding for context descriptors, comparing a distance between the embeddings against a threshold, and outputting an in-context or out-of-context label;

emitting, as a final verdict, the first verdict if the context-gating model determines the sample is out-of-context;

assembling, if the context-gating model determines the sample is in-context, contextual information by retrieving, via a similarity search over a knowledge base using dense vector retrieval with a distance threshold to select knowledge-base items, one or more items related to the sample;

providing the sample and the contextual information to the appeals model;

generating, by the appeals model, a second verdict based on the contextual information; and emitting, as the final verdict, the second verdict in preference to the first verdict.

2. The method of claim 1, further comprising providing the first verdict and, optionally, first-stage rationale to the appeals model as additional inputs.

3. The method of claim 1, wherein the appeals model is an application programming interface-accessed large language model and only processes samples pre-flagged as malicious.

4. The method of claim 1, wherein the contextual information includes a deployment-specific system prompt describing the application environment.

5. The method of claim 1, wherein the context-gating model is implemented as a two-tower neural network.

6. The method of claim 1, wherein the appeals model outputs a natural-language explanation for its verdict.

7. The method of claim 1, wherein the knowledge base comprises public or private articles related to the application domain.

8. The method of claim 1, wherein the similarity search is performed using a retrieval-augmented generation (RAG) model.

9. The method of claim 1, wherein the context-gating model is trained using labeled data indicating in-context and out-of-context samples.

10. The method of claim 1, wherein the appeals model is fine-tuned for the application domain.

11. The method of claim 1, wherein the method further comprises updating the knowledge base with new context information over time.

12. The method of claim 1, further comprising:

initiating, in response to the emitted verdict indicating that the sample is malicious, one or more remediation actions to prevent a machine learning model from behaving in an undesired manner.

13. The method of claim 1, further comprising orchestrating, by one or more autonomous software agents, at least one of:

routing the sample among the first-stage classifier, the context-gating model, and the appeals model;

performing semantic task decomposition of the sample;

coordinating data flow among the first-stage classifier, the context-gating model, and the appeals model; or dynamically selecting and parameterizing the appeals model based on the sample.

14. The method of claim 1, further comprising, prior to invoking the context-gating model, preprocessing the sample to extract modality-specific features, the sample comprising at least one of text, image, audio, video, or a multimodal combination thereof, and the preprocessing comprising at least one of tokenization, normalization, sentence embedding generation, or transformation into embedded representations using a pre-trained model.

15. The method of claim 1, further comprising, after the context-gating model determines the sample is in-context, invoking an intermediary model configured to validate whether the sample is genuinely relevant to the application domain before providing the sample to the appeals model, the intermediary model operating as a bureaucrat agent that ensures only appropriate cases are escalated to the appeals model.

16. The method of claim 1, further comprising, in response to the final verdict indicating that the sample is malicious, initiating one or more remediation actions comprising at least one of:

blocking the sample from ingestion by a machine learning model; redacting personally identifiable information from the sample;

constraining decoding parameters of the machine learning model;

disabling tool invocation capabilities;

rate limiting requests; or escalating the sample for human review.

17. The method of claim 1, further comprising, during the assembling of the contextual information, invoking a context engine that performs a semantic search over a knowledge base to retrieve one or more documents related to the sample, and processing the retrieved documents using a summarizer to generate a condensed summary that is provided to the appeals model as part of the contextual information.

18. The method of claim 1, further comprising logging, by a logging module, the first verdict, the second verdict, the contextual information, and process status for audit and retraining purposes.

19. The method of claim 1, wherein the context-gating model incorporates an output of the first-stage classifier, including at least one of a verdict and associated reasoning, as additional input features that are integrated with representations of the sample and context descriptors.

20. The method of claim 1, wherein the context engine provides different contextual information to the context-gating model and the appeals model, the contextual information provided to each model being selected based on requirements of the respective model's task.

21. A system for adjudicating suspected-malicious samples with context gating, comprising:

at least one processor; and at least one non-transitory computer-readable medium storing instructions that, when executed by the at least one processor, cause the system to perform operations comprising:

receiving a sample;

generating, by a first-stage classifier, a first verdict classifying the sample as malicious;

invoking a context-gating model distinct from the first-stage classifier and an appeals model, the context-gating model evaluating whether the sample is in-context for a specific application domain by computing an embedding for the sample and an embedding for context descriptors, comparing a distance between the embeddings against a threshold, and outputting an in-context or out-of-context label;

emitting, as a final verdict, the first verdict if the context-gating model determines the sample is out-of-context;

assembling, if the context-gating model determines the sample is in-context, contextual information by retrieving, via a similarity search over a knowledge base using dense vector retrieval with a distance threshold to select knowledge-base items, one or more items related to the sample;

providing the sample and the contextual information to the appeals model;

generating, by the appeals model, a second verdict based on the contextual information; and emitting, as the final verdict, the second verdict in preference to the first verdict.

22. The system of claim 21, wherein the instructions further cause the system to perform operations comprising: providing the first verdict and, optionally, first-stage rationale to the appeals model as additional inputs.

23. The system of claim 21, wherein the appeals model is an application programming interface-accessed large language model and only processes samples pre-flagged as malicious.

24. The system of claim 21, wherein the contextual information includes a deployment-specific system prompt describing the application environment.

25. The system of claim 21, wherein the context-gating model is implemented as a two-tower neural network.

26. The system of claim 21, wherein the appeals model outputs a natural-language explanation for its verdict.

27. The system of claim 21, wherein the knowledge base comprises public or private articles related to the application domain.

28. The system of claim 21, wherein the similarity search is performed using a retrieval-augmented generation (RAG) model.

29. The system of claim 21, wherein the instructions further cause the system to perform operations comprising:

initiating, in response to the emitted verdict indicating that the sample is malicious, one or more remediation actions to prevent a machine learning model from behaving in an undesired manner.

30. The system of claim 29, wherein the one or more remediation actions comprise at least one of:

blocking the sample from ingestion by the machine learning model;

redacting personally identifiable information from the sample;

constraining decoding parameters of the machine learning model;

disabling tool invocation capabilities;

rate limiting requests; or escalating the sample for human review.

* * * * *